US006314103B1

(12) United States Patent
Medhat et al.

(10) Patent No.: US 6,314,103 B1
(45) Date of Patent: Nov. 6, 2001

(54) SYSTEM AND METHOD FOR ALLOCATING BANDWIDTH FOR A CALL

(75) Inventors: Khalid Mohamed Medhat; Michael Joseph Gardner, both of Overland Park, KS (US); Dean Charles Boldt, Parkville, MO (US)

(73) Assignee: Sprint Communications Company, L.P., Kansas City, MO (US)

( * ) Notice: Subject to any disclaimer, the term of this patent is extended or adjusted under 35 U.S.C. 154(b) by 0 days.

(21) Appl. No.: 09/027,416

(22) Filed: Feb. 20, 1998

Related U.S. Application Data

(63) Continuation-in-part of application No. 08/594,660, filed on Feb. 2, 1996, now Pat. No. 6,081,525, which is a continuation-in-part of application No. 08/568,551, filed on Dec. 7, 1995, now Pat. No. 5,825,780, and a continuation-in-part of application No. 08/525,897, filed on Sep. 8, 1995, now Pat. No. 5,991,301, which is a continuation-in-part of application No. 08/238,605, filed on May 5, 1994, now abandoned, application No. 09/027,416, which is a continuation-in-part of application No. 08/568,551, filed on Dec. 7, 1995, and a continuation-in-part of application No. 08/525,050, filed on Sep. 8, 1995, now Pat. No. 6,181,703, which is a continuation-in-part of application No. 08/238,605, filed on May 5, 1994.

(51) Int. Cl.[7] .............................. H04L 12/28; H04L 12/56
(52) U.S. Cl. ............................................. 370/395; 370/468
(58) Field of Search .................................... 370/395, 396, 370/397, 398, 399, 465, 468, 400, 401, 409

(56) References Cited

U.S. PATENT DOCUMENTS

| 4,201,889 | 5/1980 | Lawrence et al. . |
| 4,310,727 | 1/1982 | Lawser . |
| 4,348,554 | 9/1982 | Asmuth . |
| 4,453,247 | 6/1984 | Suzuki et al. . |

(List continued on next page.)

FOREIGN PATENT DOCUMENTS

| 90312739 | 7/1991 | (EP) . |
| 91303312 | 10/1991 | (EP) . |

(List continued on next page.)

OTHER PUBLICATIONS

Yoshikai, N., et al., "Report of the Meeting of SWP 13/1–4 (Draft Recommendation I.580)," ITU–T Telecommunication Standardization Sector, Study Group 13, pp. 1–51, (Mar. 7–18, 1994).

N/A, "Final Draft Text for Broadband Capability Set 2 Signaling Requirements, Attachment "D" Special Drafting Meeting," ITU–T Telecommunications Standardization Sector, Study Group 11, p. 1–127, (Sep. 13–22, 1993).

(List continued on next page.)

*Primary Examiner*—Ricky Ngo
(74) *Attorney, Agent, or Firm*—Harley R. Ball; Steven J. Funk

(57) ABSTRACT

A system and method for allocating bandwidth in an asynchronous transfer mode (ATM) system under-allocates bandwidth in virtual paths for virtual path groups between ATM devices. A bandwidth allocation platform manages the virtual paths in the ATM system to control allocation and to prevent congestion, while providing efficient utilization of the bandwidth within the ATM system. The bandwidth allocation system under-allocates virtual paths for virtual path groups that require additional bandwidth to make connections for calls. When a connection is selected on the under-allocated virtual path, the virtual path may use bandwidth from another virtual path in the virtual path group or from a virtual path in another virtual path group if needed. A communication device transports user communications and call signaling for a call. A signaling processor processes the call signaling to select a connection in one of the under-allocated virtual paths for the call over the virtual path group. An interworking unit interworks the user communications from the format in which the user communications are received from the communication device to asynchronous transfer mode cells that identify the selected connection.

104 Claims, 10 Drawing Sheets

U.S. PATENT DOCUMENTS

| | | |
|---|---|---|
| 4,554,659 | 11/1985 | Blood et al. . |
| 4,565,903 | 1/1986 | Riley . |
| 4,683,563 | 7/1987 | Rouse et al. . |
| 4,730,312 | 3/1988 | Johnson . |
| 4,736,364 | 4/1988 | Basso et al. . |
| 4,748,658 | 5/1988 | Gopal et al. . |
| 4,823,338 | 4/1989 | Chan et al. . |
| 4,853,955 | 8/1989 | Thorn et al. . |
| 4,896,319 | 1/1990 | Lidinsky et al. . |
| 4,916,690 | 4/1990 | Barri . |
| 4,926,416 | 5/1990 | Weik . |
| 4,979,118 | 12/1990 | Kheradpir . |
| 4,985,889 | 1/1991 | Frankish et al. . |
| 4,991,204 | 2/1991 | Yamamoto et al. . |
| 4,993,014 | 2/1991 | Gordon . |
| 5,003,584 | 3/1991 | Benyacar et al. . |
| 5,018,191 | 5/1991 | Catron et al. . |
| 5,036,318 | 7/1991 | Bachhuber et al. . |
| 5,048,081 | 9/1991 | Gavaras et al. . |
| 5,058,104 | 10/1991 | Yonehara et al. . |
| 5,067,123 | 11/1991 | Hyodo et al. . |
| 5,084,867 | 1/1992 | Tachibana et al. . |
| 5,089,954 | 2/1992 | Rago . |
| 5,091,903 | 2/1992 | Schrodi . |
| 5,101,404 | 3/1992 | Kunimoto et al. . |
| 5,115,431 | 5/1992 | Williams et al. . |
| 5,163,057 | 11/1992 | Grupp . |
| 5,168,492 | 12/1992 | Beshai et al. . |
| 5,179,556 | 1/1993 | Turner . |
| 5,185,743 | 2/1993 | Murayama et al. . |
| 5,193,110 | 3/1993 | Jones et al. . |
| 5,204,857 | 4/1993 | Obara . |
| 5,216,669 | 6/1993 | Hofstetter et al. . |
| 5,218,602 | 6/1993 | Grant et al. . |
| 5,231,631 | 7/1993 | Buhrke et al. . |
| 5,231,633 | 7/1993 | Hluchyj et al. . |
| 5,233,607 | 8/1993 | Barwig et al. . |
| 5,239,539 | 8/1993 | Uchida et al. . |
| 5,249,178 | 9/1993 | Kurano et al. . |
| 5,251,255 | 10/1993 | Epley . |
| 5,253,247 | 10/1993 | Hirose et al. . |
| 5,255,266 | 10/1993 | Watanabe et al. . |
| 5,258,752 | 11/1993 | Fukaya et al. . |
| 5,258,979 | 11/1993 | Oomuro et al. . |
| 5,268,895 | 12/1993 | Topper . |
| 5,271,010 | 12/1993 | Miyake et al. . |
| 5,274,680 | 12/1993 | Sorton et al. . |
| 5,278,889 | 1/1994 | Papanicolaou et al. . |
| 5,282,244 | 1/1994 | Fuller et al. . |
| 5,285,441 | 2/1994 | Bansal et al. . |
| 5,291,479 | 3/1994 | Vaziri et al. . |
| 5,311,509 | 5/1994 | Heddes et al. . |
| 5,317,562 | 5/1994 | Nardin et al. . |
| 5,323,389 | 6/1994 | Bitz et al. . |
| 5,327,421 | 7/1994 | Hiller et al. . |
| 5,329,308 | 7/1994 | Binns et al. . |
| 5,339,318 | 8/1994 | Tanaka et al. . |
| 5,345,443 | 9/1994 | D'Ambrogio et al. . |
| 5,345,445 | 9/1994 | Hiller et al. . |
| 5,345,446 | 9/1994 | Hiller et al. . |
| 5,357,510 | 10/1994 | Norizuki et al. . |
| 5,363,433 | 11/1994 | Isono . |
| 5,365,524 | 11/1994 | Hiller et al. . |
| 5,367,566 | 11/1994 | Moe et al. . |
| 5,373,504 | 12/1994 | Tanaka et al. . |
| 5,375,124 | 12/1994 | D'Ambrogio et al. . |
| 5,377,186 | 12/1994 | Wegner et al. . |
| 5,384,771 | 1/1995 | Isidoro et al. . |
| 5,384,840 | 1/1995 | Blatchford et al. . |
| 5,392,402 | 2/1995 | Robrock . |
| 5,394,393 | 2/1995 | Brisson et al. . |
| 5,394,398 | 2/1995 | Rau . |
| 5,414,701 | 5/1995 | Shtayer et al. . |
| 5,418,783 | 5/1995 | Yamaki et al. . |
| 5,420,857 | 5/1995 | Jurkevich . |
| 5,420,858 | 5/1995 | Marshall et al. . |
| 5,420,916 | 5/1995 | Sekiguchi . |
| 5,422,882 | 6/1995 | Hiller et al. . |
| 5,425,090 | 6/1995 | Orriss . |
| 5,426,636 | 6/1995 | Hiller et al. . |
| 5,428,607 | 6/1995 | Hiller et al. . |
| 5,428,609 | 6/1995 | Eng et al. . |
| 5,434,852 | 7/1995 | La Porta et al. . |
| 5,434,981 | 7/1995 | Lenihan et al. . |
| 5,440,563 | 8/1995 | Isidoro et al. . |
| 5,444,713 | 8/1995 | Backaus et al. . |
| 5,446,738 | 8/1995 | Kim et al. . |
| 5,452,297 | 9/1995 | Hiller et al. . |
| 5,453,981 | 9/1995 | Katsube et al. . |
| 5,454,034 | 9/1995 | Martin . |
| 5,457,684 | 10/1995 | Bharucha et al. . |
| 5,463,620 | 10/1995 | Sriram . |
| 5,463,621 | 10/1995 | Suzuki . |
| 5,473,677 | 12/1995 | D'Amato et al. . |
| 5,473,679 | 12/1995 | La Porta et al. . |
| 5,477,537 | 12/1995 | Dankert et al. . |
| 5,479,401 | 12/1995 | Bitz et al. . |
| 5,479,402 | 12/1995 | Hata et al. . |
| 5,479,495 | 12/1995 | Blumhardt . |
| 5,483,527 | 1/1996 | Doshi et al. . |
| 5,485,455 | 1/1996 | Dobbins et al. . |
| 5,495,484 | 2/1996 | Self et al. . |
| 5,504,742 | 4/1996 | Kakuma et al. . |
| 5,506,844 | 4/1996 | Rao . |
| 5,509,010 | 4/1996 | La Porta et al. . |
| 5,509,123 | 4/1996 | Dobbins et al. . |
| 5,513,178 | 4/1996 | Tanaka . |
| 5,519,707 | 5/1996 | Subramanian et al. . |
| 5,521,910 | 5/1996 | Matthews . |
| 5,522,042 | 5/1996 | Fee et al. . |
| 5,526,414 | 6/1996 | Bedard et al. . |
| 5,530,698 | 6/1996 | Kozaki et al. . |
| 5,533,106 | 7/1996 | Blumhardt . |
| 5,539,815 | 7/1996 | Samba . |
| 5,539,816 | 7/1996 | Pinard et al. . |
| 5,539,884 | 7/1996 | Robrock, II . |
| 5,541,918 | 7/1996 | Ganmukhi et al. . |
| 5,541,926 | 7/1996 | Saito et al. . |
| 5,544,152 | 8/1996 | Obermanns et al. . |
| 5,544,161 | 8/1996 | Bigham et al. . |
| 5,548,580 | 8/1996 | Buckland . |
| 5,550,819 | 8/1996 | Duault . |
| 5,550,914 | 8/1996 | Clarke et al. . |
| 5,563,939 | 10/1996 | La Porta et al. . |
| 5,566,173 | 10/1996 | Steinbrecher . |
| 5,568,475 | 10/1996 | Doshi et al. . |
| 5,570,368 | 10/1996 | Murakami et al. . |
| 5,577,039 | 11/1996 | Won et al. . |
| 5,579,311 | 11/1996 | Chopping et al. . |
| 5,587,999 | 12/1996 | Endo . |
| 5,592,477 | 1/1997 | Farris et al. . |
| 5,600,640 | 2/1997 | Blair et al. . |
| 5,600,643 | 2/1997 | Robrock, II . |
| 5,627,836 | 5/1997 | Conoscenti et al. . |
| 5,629,930 | 5/1997 | Beshai et al. . |
| 5,629,938 | 5/1997 | Cerciello et al. . |
| 5,635,980 | 6/1997 | Lin et al. . |
| 5,636,210 | 6/1997 | Agrawal et al. . |
| 5,640,446 | 6/1997 | Everett et al. . |
| 5,666,349 | 9/1997 | Petri . |
| 5,673,262 | 9/1997 | Shimizu . |

| | | |
|---|---|---|
| 5,680,390 | 10/1997 | Robrock, II . |
| 5,703,876 | 12/1997 | Christie . |
| 5,708,702 | 1/1998 | DePaul et al. . |
| 5,710,769 | 1/1998 | Anderson et al. . |
| 5,719,863 | 2/1998 | Hummel . |
| 5,751,706 | 5/1998 | Land . |
| 5,825,780 | 10/1998 | Christie . |
| 5,878,029 * | 3/1999 | Hasegawa et al. ................... 370/468 |
| 5,920,562 | 7/1999 | Christie et al. . |
| 5,940,491 | 8/1999 | Anderson et al. . |
| 5,953,338 | 9/1999 | Ma . |
| 5,987,031 * | 11/1999 | Miller et al. ......................... 370/468 |
| 5,991,301 | 11/1999 | Christie . |
| 6,009,106 * | 12/1999 | Rustad et al. ........................ 370/468 |

FOREIGN PATENT DOCUMENTS

| | | |
|---|---|---|
| 91311342 | 7/1992 | (EP) . |
| 92307752 | 9/1993 | (EP) . |
| 870284896 | 5/1989 | (JP) . |
| 07050057 | 9/1996 | (JP) . |
| WO94/06251 | 3/1994 | (WO) . |
| WO95/04436 | 2/1995 | (WO) . |

OTHER PUBLICATIONS

Ohta, S., et al., "A Dynamically Controllable ATM Transport Network Based on the Virtual Path Concept," Communications for the Information Age, Globecom'88, Conference Record, p. 1272–1276, (Nov. 28–Dec. 1, 1988).

Fukazawa, M., et al., "Intelligent Network Call Model for Broadband ISDN," Fujitsu Laboratories, Ltd. (Japan), p. 30.6.1–30.6.5.

Minzer, Steven, "A Signaling Protocol for Complex Multimedia Services," IEEE Journal on Selected Areas in Communications (ISSN 0733–8716), vol. 9, (No. 9), p. 1383–1394, (Dec. 1991).

Faynberg, I., et al., "The Support of Network Interworking and Distributed Context Switching in the IN Service Data Function Model," 2nd Colloque International, ICIN 92, p. 11–16, (Mar. 1992).

Woodworth, Clark B., et al., "A Flexible Broadband Packet Switch for a Multimedia Integrated Network," International Conference on Communications, Denver, ICC–91, p. 3.2.1–3.2.8, (Jun. 1991).

Miller, P., "Intelligent Network/2: A flexible framework for exchange services," Bell Communications Research Exchange, vol. 3 (No. 3), (May/Jun. 1987).

Cooper, C., et al., "Toward a Broadband Congestion Control Strategy," IEEE Network, The Magazine of Computer Communications, (May 1990).

Batten, A., "Personal Communications Services and the Intelligent Network," British Telecommunications Engineering, (Aug. 1990).

Fujioka, M., et al., "Universal Service Creation and Provision Environment for Intelligent Network," IEEE Communications Magazine, (Jan. 1991).

Andrews, F., "Switching in a Competitive Market," IEEE Communications Magazine, (Jan. 1991).

N/A, "Network Signaling," Telephony, TCX12004, University of Excellence, p. 5.8–5.17, (Oct. 21, 1991).

Garrahan, J.J., et al., "Intelligent Network Overview," IEEE Communications Magazine, p. 30–36, (Mar. 1993).

Johnson, M.A., et al., "New Service Testing Functions for Advanced Intelligent Networks," IEEE 1992 Network Operations and Management Symposium, p. 709–720, (Apr. 6, 1992).

Yeh, S.Y., et al., "The Evolving Intelligent Network Architecture," IEEE Conference on Computer and Communication Systems, p. 835–839, (1990).

Atoui, M., "Virtual Private Network Call Processing in the Intelligent Network," International Conference on Communications, p. 561–565, (1992).

Bosco, P., et al., "A Laboratory for AIN Service Design and Validation," International Conference on Communications, p. 566–571, (Jun. 14, 1992).

Homa, J., et al., "Intelligent Network Requirements for Personal Communications Services," IEEE Communications Magazine, p. 70–76, (Feb. 1992).

Russo, E.G., et al., "Intelligent Network Platforms in the U.S.," AT&T Technical Journal, p. 26–43, (1991).

Van Den Broek, W., et al., "RACE 2066–Functional models of UMTS and integration into the future networks," Electronics & Communications Engineering Journal, p. 165–172, (Jun. 1993).

Pinkham, G., et al., "The Ericsson Approach to Intelligent Networks," IEEE Global Telecommunications Conference & Exhibition, Session 10, paragraph 4, p. 320–324, (1988).

N/A, "ANSI–TI.111–1992, Signaling System No. 7 (SS7)—Message Transfer Part (MTP)," American National Standard for Telecommunications.

N/A, "ANSI–TI.112–1992, Signaling System No. 7 (SS7)—Signaling Connection Control Part (SCCP)," American National Standard for Telecommunications.

N/A, "ANSI–TI.113–1992, Signaling System No. 7 (SS7)—Integrated Services digital Network (ISDN) User Part," American National Standard for Telecommunications.

N/A, "ANSI–TI.113a–1993, Signaling System No. 7 (SS7)—Integrated Services Digital Network (ISDN) User Part (NxDSO Multi–rate Connection)," American National Standard for Telecommunications.

N/A, "ANSI–TI.113–1995, Signaling System No. 7 (SS7)—Integrated Services Digital Network (ISDN) User Part," American National Standard for Telecommunications.

N/A, "ATM at a Glance," Transmission Technologies Access Guide, p. 40–42, (1993).

Paglialunga, A., "ISCP Baseline Document (VER 3.1)," ITU Telecommunication Standardization Sector, Centre Studi E Laboratori Telecommunicazioni S.p.A., (1993).

N/A, "A Technical Report on Speech Packetization," Document T1A1/94—Prepared by T1A1.7, Working Group on Specilaized Signal Processing.

N/A, "Draft Revised Recommendation I.580," ITU—Telecommunication Standardization Sector, Study Group 13, (Jul. 10–21, 1995).

Sprague, David, "MTP Level–3 Gateway STP Release 3.2.0," Tekelec, p. 1–48, (Aug. 4, 1995).

McDysan, David E. and Spohn, Darren L., "ATM Theory and Application," ATM Layer VPI/VCI Level Addressing, p. 256: 9.3.1, (1994).

Minoli, Daniel and Dobrowski, George, "Principles of Signaling for Cell Relay and Frame Relay," DVI Comm., Inc. / Stevens Institute of Technology / Bell Comm. Research (Bellcore), p. 1–2, 5–6 and 229, (1994).

N/A, "B–IDSN ATM Adaptation Layer (AAL) Specification, Types 1 & 2," ITU Draft Recommendation I.363.1, (Jul. 21, 1995).

N/A, "Circuit Emulation Service Interoperability Specification Version 2.0 (Baseline Draft), 95–1504," The ATM Forum Technical Committee, (Dec. 1995).

N/A, "IN/B–ISDN Signalling Three Ways of Integration," ITU—Telecommunication Standardization Sector, Study Group 11, (Nov. 29 –Dec. 17, 1993).

N/A, "Interworking B–ISUP and Q.93B for DDI, MSN, TP and SUB," ITU—Telecommunication Standarization Sector, Study Group 11, (Nov. 29 –Dec. 17, 1993).

NA, "Revised Draft of Q.2650 (DSS2/B–ISUP Interworking Recommendation)," ITU—Telecommunication Standardization Sector, Study Group 11, (Nov. 29 –Dec. 17, 1993).

N/A, "Draft Broadband / Narrowband NNI interworking recommendation," ITU—Telecommunication Standardization Sector, Study Group 11, (Dec. 1993).

N/A, "Draft Recommendation Q.2761," ITU—Telecommunication Standardization Sector, Study Group 11, (Nov. 29 –Dec. 17, 1993).

N/A, "Draft Recommendation Q.2762," ITU—Telecommunication Standarization Sector, Study Group 11, (Nov. 29 –Dec. 17, 1993).

N/A, "Q.2931 Overview," ITU—Telecommunication Standarization Sector, (Nov. 29 –Dec. 17, 1993).

N/A, "Clean final draft text for B–ISUP formats and codes (Q.2763) in ASN.1," ITU—Telecommunication Standardization Sector, Study Group 11, (Nov. 29 –Dec. 17, 1993).

N/A, "Updated draft of Q.2764 (BQ.764)," ITU—Telecommunication Standardization Sector, Study Group 11, (Nov. 29 –Dec. 17, 1993).

N/A, "Final B–ISUP SDLs," ITU—Telecommunication Standardization Sector, Study Group 11, (Nov. 29 –Dec. 17, 1993).

N/A, "Draft Recommendation Q.2650," ITU—Telecommunication Standardization Sector, Study Group 11, (Nov. 29 –Dec. 17, 1993).

N/A, "Revised Draft of Q.2650 (DSS2/B–ISUP Interworking Recommendation)," ITU—Telecommunication Standardization Sector, Study Group 11, (Nov. 29 –Dec. 17, 1993).

N/A, "Revision of Recommendation of Q.850," ITU—T SG 11 WP 2, (Dec. 2–15, 1993).

N/A, "Draft Text for Q.2931 (CH. 1, 2 and 3)," ITU—Telecommunication Standardization Sector, Study Group 11, (Dec. 1993).

N/A, "Q.2931, Clause 4—Information Elements," ITU—Telecommunication Standardization Sector, (Nov. 29 –Dec. 17, 1993).

N/A, "Section 5 of Q.93B," ITU—Telecommunication Standardization Sector, Study Group 11, (Nov. 29 –Dec. 17, 1993).

N/A, "Chapter 6 of Recommendation Q.93B," ITU—Telecommunication Standardization Sector, Study Group 11, (Nov. 29 –Dec. 17, 1993).

N/A, "Clauses 7 and 8 of Q.2931," ITU—Telecommunication Standardization Sector, Study Group 11, (Dec. 1993).

N/A, "Revised Q.2931 User Side SDL Diagrams," ITU—Telecommunication Standardization Sector, Study Group 11, (Nov. 29 –Dec. 17, 1993).

N/A, "Revised Q.2931 Network Side SDL Diagrams," ITU—Telecommunication Standardization Sector, Study Group 11, (Nov. 29 –Dec. 17, 1993).

N/A, "AnnexesB, C, D, F, H and I of Q.2931," ITU—Telecommunication Standardization Sector, Study Group 11, (Nov. 29 –Dec. 17, 1993).

N/A, "Annex E of Recommendation Q.93B," ITU—Telecommunication Standardization Sector, Study Group 11, (Nov. 29 –Dec. 17, 1993).

N/A, "Rec. Q.2931, Annex G—Status Monitoring of SPCs," ITU—Telecommunication Standardization Sector, Study Group 11, (Nov. 29 –Dec. 17, 1993).

N/A, "Annex J of Q.2931," ITU—Telecommunication Standardization Sector, Study Group 11, (Dec. 1993).

N/A, "Appendix 1/Q.2931: Guidelines for the Use of Instruction Indicators," ITU—Telecommunication Standardization Sector, Study Group 11, (Nov. 29 –Dec. 17, 1993).

N/A, "Draft text for Q.2931: Appendix II (Information Items Required for Connection Establishment and Routing in B–ISDN)," ITU—Telecommunication Standardization Sector, Study Group 11.

N/A, "General Recommendations on Telephone Switching and Signalling—Intelligent Network/Distributed Functional Plane for Intelligent Network CS–1," ITU–T Recommendation Q.1214.

Kumar, Sanjay, "Legacy Voice Service at a Native ATM Terminal," ATM_Forum/95–0917R1, ATM Forum Technical Committee, (Oct. 2–6, 1995).

Duault, Maurice, et al., "Baseline Text for Voice and Telephony Over ATM—ATM Trunking for Narrowband Services," ATM_Forum/95–0446R3, ATM Forum Technical Committee, (Oct. 2–6, 1995).

Choi, Don, "Requirements for ATM Trunking," ATM_Forum/95–1401, ATM Forum Technical Committee, (Oct. 2–6, 1995).

Chiang, Chin, "Proposed Changes to Proxy Signaling Capability," ATM Forum/95–0046, ATM Forum: Signaling Working Group, (Feb. 6–10, 1995).

Amin–Salehi, Bahman, "Third Party Call Setup for a Video–on Demand Connection Establishment," ATM_Forum/95–0022, ATM Forum Technical Committee, (Feb. 5–8, 1995).

Caves, Keith, "Proposed Modifications to the Baseline Text (95–0446R2) of the 'VTOA—ATM Trunking for Narrowband Services' Specification," ATM Forum/95–1134, ATM Forum Technical Committee, (Oct. 2–6, 1995).

Schink, Helmut, et al., "CES as a Flexible Trunking Method," ATM_Forum/95–1157, ATM Forum Technical Committee, (Oct. 2–6, 1995).

Duault, Maurice, "Proposal for ATM Trunking Options," ATM_Forum/95–1230, ATM Forum Technical Committee, (Oct. 2–6, 1995).

Okutani, Takenori, et al., "VTOA: Reference Configuration–ATM Trunking for Narrowband Services," ATM–Forum/95–1354, ATM Forum Technical Committee, (Oct. 2–6, 1995).

Stodola, Kevin, "Circuit Emulation Services Version 2 Baseline," ATM_Forum/95–1504, ATM Forum Technical Committee, (Dec. 11–15, 1995).

N/A, "I.751 Asynchronous Transfer Mode (ATM) Management View of the Network Element View," ITU—Telecommunication Standardization Sector, Study Group 15, (Nov. 13–24, 1995).

N/A, "Draft I.732," ITU—Telecommunication Standardization Sector, Study Group 15, (Nov. 13–24, 1995).

N/A, "Editorial Modifications for Draft New ITU–T Recommendation I.731," ITU—Telecommunication Standardization Sector, Study Group 15, (Nov. 13–24, 1995).

Buhrke, R.E., "Proposed Unified Functional Model," T1S1.5/95–036, Committee T1 Contribution, (Feb. 1995).

Beckman, Richard T. and Mathews, Joseph R., "Proposal for a Physical Architecture Based on the Harmonized Functional Architecture," T1S1.5/95–027, Committee T1 Contribution, (Feb. 20–24, 1995).

Beckman, Richard T. and Matthews, Joseph R., "Proposal for a Physical Architecture Based on the Harmonized Functional Architecture," Committee T1 Contribution T1S1.5/95–027, Bellcore, (Feb. 20, 1995).

Shenoda et. al.,. "A Method For Dynamic Bandwidth Allocation For Voice Trunking Using CES With CAS," ATM Forum Technical Committee 96–0136, Feb. 5, 1996.

\* cited by examiner-

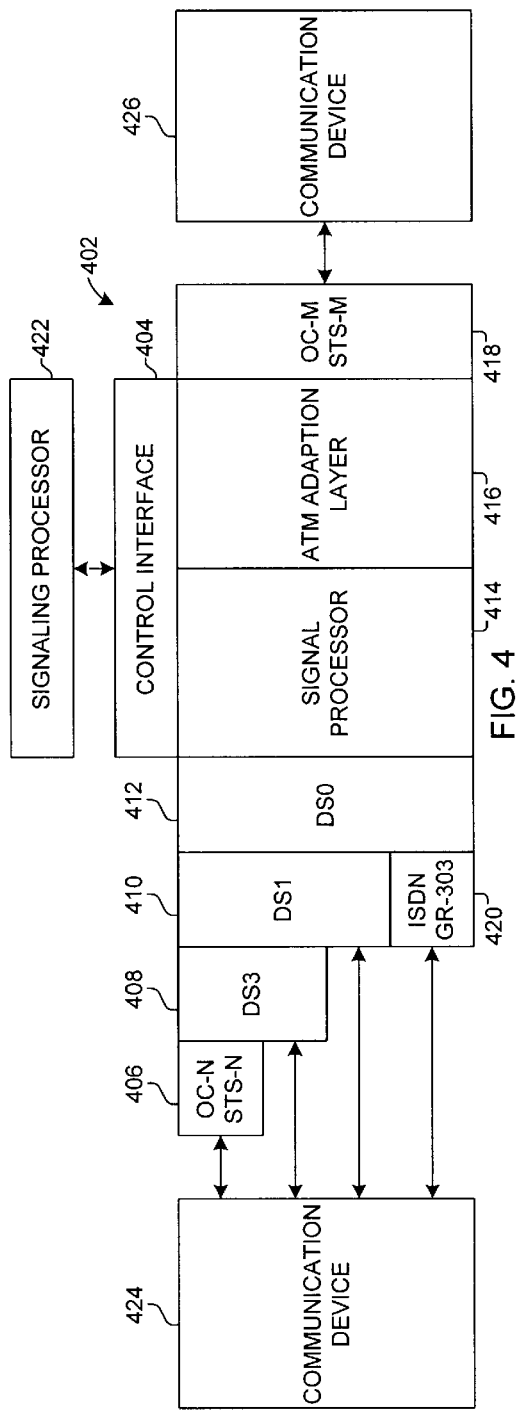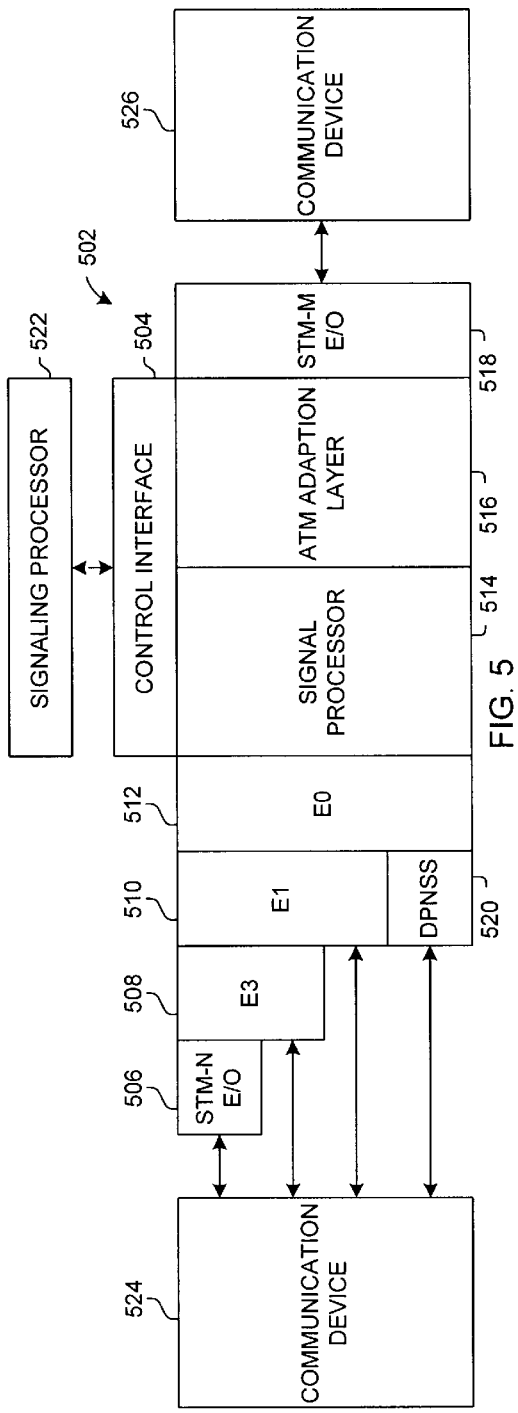

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/ DATE |
|---|---|---|---|---|---|---|---|---|---|---|---|---|
| | | | | | | | | | | | | |
| | | | | | | | | | | | | |
| | | | | | | | | | | | | |

FIG. 9

| TRUNK GROUP NUMBER | GLARE RESOLUTION | CONTINUITY CONTROL | CLLI | SATELLITE TRUNK GROUP | SERVICE INDICATOR | NPA | SEL SEQ | HOP COUNTER | ACC ACTIVE | RE-ATTEMPT CIRCUIT | DEFAULT JIP/LRN | OMI | NEXT FUNCTION | NEXT INDEX |
|---|---|---|---|---|---|---|---|---|---|---|---|---|---|---|
| | | | | | | | | | | | | | | |
| | | | | | | | | | | | | | | |
| | | | | | | | | | | | | | | |

FIG. 10

| EXCEPTION TABLE INDEX | CARRIER SELECTION IDENTIFICATION | CARRIER IDENTIFICATION | NATURE OF ADDRESS | CALLED PARTY | | NEXT FUNCTION | NEXT INDEX |
|---|---|---|---|---|---|---|---|
| | | | | DIGITS FROM | DIGITS TO | | |
| | | | | | | | |
| | | | | | | | |

| ANI TABLE INDEX | CALLING PARTY/CHARGE NUMBER ||||| ORIGINATING LINE INFORMATION | NEXT FUNCTION | NEXT INDEX |
|---|---|---|---|---|---|---|---|---|
| | CALLING PARTY CATEGORY | NATURE OF ADDRESS | DIGITS FROM | DIGITS TO | DATA | | | |
| | | | | | | | | |
| | | | | | | | | |

FIG. 13

| CALLED NUMBER SCREENING TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 14

| LRN TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 15

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 16

| ROUTING TABLE INDEX | TRANSIT NETWORK SELECTION | | | NEXT FUNCTION #1 | INDEX #1 | SIGNAL ROUTE | NEXT FUNCTION #2 | INDEX #2 | SIGNAL ROUTE | NEXT FUNCTION #3 | INDEX #3 | SIGNAL ROUTE |
| | NETWORK IDENTIFICATION | DIGITS PLAN | CIRCUIT CODE | | | | | | | | | |
|---|---|---|---|---|---|---|---|---|---|---|---|---|
| | | | | | | | | | | | | |
| | | | | | | | | | | | | |

FIG. 17

| TREATMENT TABLE INDEX | MESSAGE RECEIVED CAUSE VALUE | GENERAL LOCATION | CODING STANDARD | CAUSE VALUE | NEXT FUNCTION | NEXT INDEX |
|---|---|---|---|---|---|---|
| | | | | | | |
| | | | | | | |

| MESSAGE TYPE | PARAMETERS | INDEX #1 | INDEX #.... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | LNP SIGNALING INSTRUCTION PARAMETER | | | |
| | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | JURISDICTION | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

SYSTEM AND METHOD FOR ALLOCATING BANDWIDTH FOR A CALL

RELATED APPLICATIONS

This application is a continuation-in-part of prior Ser. No. 08/594,660 U.S. Pat. No. 6,081,525, filed on Feb. 2, 1996, entitled "BROADBAND TELECOMMUNICATIONS SYSTEM," which is hereby incorporated by reference into this application, and which is a continuation-in-part of prior Ser. No. 08/525,897 U.S. Pat. No. 5,991,301, filed on Sep. 8, 1995, entitled "BROADBAND TELECOMMUNICATIONS SYSTEM," which is hereby incorporated by reference into this application, and which is a continuation-in-part of prior Ser. No. 08/568,551 U.S. Pat. No. 5,825,780, filed on Dec. 7, 1995, entitled "METHOD, SYSTEM AND APPARATUS FOR TELECOMMUNICATIONS CONTROL," which is hereby incorporated by reference into this application, and which is a continuation of prior abandoned U.S. patent application Ser. No. 08/238,605, filed on May 5, 1994, entitled "METHOD, SYSTEM AND APPARATUS FOR TELECOMMUNICATIONS CONTROL," which is hereby incorporated by reference into this application.

This application is also a continuation-in-part of prior Ser. No. 08/525,050 U.S. Pat. No. 6,181,703, filed on Sep. 8, 1995, entitled "SYSTEM FOR MANAGING TELECOMMUNICATIONS," which is hereby incorporated by reference into this application, and which is a continuation-in-part of prior Ser. No. 08/568,551 U.S. Pat. No. 5,825,780, filed on Dec. 7, 1995, entitled "METHOD, SYSTEM AND APPARATUS FOR TELECOMMUNICATIONS CONTROL," which is hereby incorporated by reference into this application, and which is a continuation of prior abandoned U.S. Pat. application Ser. No. 08/238,605, filed on May 5, 1994, entitled "METHOD, SYSTEM AND APPARATUS FOR TELECOMMUNICATIONS CONTROL," which is hereby incorporated by reference into this application.

FEDERALLY SPONSORED RESEARCH OR DEVELOPMENT

Not Applicable

MICROFICHE APPENDIX

Not Applicable

FIELD OF THE INVENTION

The present invention relates to the field of telecommunications call switching and transport and bandwidth allocation.

BACKGROUND OF THE INVENTION

Broadband systems are being developed and implemented. Broadband systems provide telecommunications providers with many benefits, including greater bandwidth, more efficient use of bandwidth, and the ability to integrate voice, data, and video communications. These broadband systems provide callers with increased capabilities at lower costs.

It is difficult to estimate the anticipated need for the number of virtual circuits between devices in the broadband systems. As a result, the bandwidth capacity of virtual circuit groups in broadband systems often is underutilized. Therefore, there is a need for a system that can manage virtual connections in broadband systems so that the available bandwidth capacity is more effectively utilized.

SUMMARY OF THE INVENTION

The present invention comprises a system for allocating bandwidth for a call having call signaling and user communications. The system comprises a virtual path group having a plurality of virtual paths. Bandwidth initially is under-allocated to each of the virtual paths. The system further comprises a signaling processor that is adapted to re-allocate the bandwidth available to a particular one of the virtual paths in a particular one of the virtual path groups when the bandwidth initially allocated to the particular virtual path is not sufficient to connect the call. The particular virtual path uses bandwidth initially allocated for another virtual path in the virtual path group. The signaling processor processes the call signaling to select a connection over the particular virtual path and transports a control message that designates the selected connection. An interworking unit is included in the system. The interworking unit is adapted to receive the user communications in a communication format and to receive the control message from the signaling processor. The interworking unit interworks the user communications between the communication format and asynchronous transfer mode cells that identify the selected connection and transports the asynchronous transfer mode cells over the selected connection.

The present invention also comprises a system for allocating bandwidth for a call having call signaling and user communications. The system comprises a virtual path group having a plurality of virtual paths. Bandwidth initially is under-allocated to each of the virtual paths. The system further comprises a signaling processor that is adapted to re-allocate the bandwidth available to a particular one of the virtual paths in a particular one of the virtual path groups when the bandwidth initially allocated to the particular virtual path is not sufficient to connect the call. The particular virtual path uses bandwidth initially allocated for another virtual path in another virtual path group. The signaling processor processes the call signaling to select a connection over the particular virtual path and transports a control message that designates the selected connection. An interworking unit is included in the system. The interworking unit is adapted to receive the user communications in a communication format and to receive the control message from the signaling processor. The interworking unit interworks the user communications between the communication format and asynchronous transfer mode cells that identify the selected connection and transports the asynchronous transfer mode cells over the selected connection.

The present invention further comprises a system for allocating bandwidth for a call having call signaling and user communications. The system comprises a plurality of virtual channels and a plurality of virtual paths that each have a portion of the virtual channels available for use. A plurality of virtual path groups is included, and each virtual path group has a portion of the virtual paths available for use. The system further comprises a signaling processor that is adapted to allocate the virtual paths in the virtual path groups so that particular virtual paths use virtual channels from other virtual paths when needed. The signaling processor receives the call signaling and processes the call signaling to select a connection over a selected one of the allocated virtual paths over a selected one of the virtual path groups. The signaling processor transports a control message that designates the selected connection. The system includes an interworking unit that is adapted to receive the user communications in a communication format, to receive the control message from the signaling processor, and to interwork the user communications between the communication format and asynchronous transfer mode cells that identify the selected connection. The interworking unit transports the asynchronous transfer mode cells over the selected connection.

Still further, the present invention comprises a bandwidth allocation system for connecting a call over a network having a plurality of virtual channels with bandwidth and a plurality of virtual paths. Each virtual path is configured to use a portion of the bandwidth of the virtual channels. The call has call signaling and user communications. The system comprises a signaling processor and an interworking unit. The signaling processor is adapted to re-allocate bandwidth available to the virtual paths for use by a selected one of the virtual path groups. The signaling processor receives the call signaling and processes the call signaling to select a connection on a selected one of the re-allocated virtual paths. The signaling processor transports a control message that designates the selected connection. The interworking unit is adapted to receive the user communications in a communication format, to receive the control message from the signaling processor, and to interwork the user communications with the selected connection so that the selected virtual path uses bandwidth from another of the virtual paths.

The present invention is directed to a bandwidth allocation system for connecting a call over an asynchronous transfer mode system that has a plurality of virtual paths. Each virtual path has bandwidth initially under-allocated thereto. The call has call signaling and user communications. The system comprises a signaling processor that is adapted to receive the call signaling and to process the call signaling to select a virtual connection over a selected one of the under-allocated virtual paths. The selected under-allocated virtual path has used all of the bandwidth initially allocated thereto, thus reaching its critically allocated point. The signaling processor transports a control message that designates the selected virtual connection. The system has a bandwidth allocation platform that is adapted to determine that the selected under-allocated virtual path has used all of the bandwidth initially allocated thereto and to allocate bandwidth, if available, from another virtual path so that the selected under-allocated virtual path can use the bandwidth. The system further includes an interworking unit adapted to receive the user communications in a communication format, to receive the control message from the signaling processor, and to interwork the user communications between the communication format and asynchronous transfer mode cells that identify the selected virtual connection. The interworking unit transports the asynchronous transfer mode cells over the selected virtual connection.

The present invention also is directed to a bandwidth allocation system for connecting a call over an asynchronous transfer mode system that has a plurality of virtual paths. Each virtual path has bandwidth initially under-allocated thereto. The call has call signaling and user communications. The system comprises a signaling processor that is adapted to receive the call signaling and to process the call signaling to select a virtual connection over a selected one of the under-allocated virtual paths. The selected under-allocated virtual path has used all of the bandwidth initially allocated thereto, thus reaching its critically allocated point. The signaling processor transports a control message that designates the selected virtual connection and allocates bandwidth if available from another virtual path so that the selected under-allocated virtual path can use the bandwidth from another virtual path. The system has a bandwidth allocation platform that is adapted to track usage of the under-allocated virtual paths and to provide to the signaling processor usage information about the under-allocated virtual paths available so that the signaling processor can select the connection. The system further includes an interworking unit adapted to receive the user communications in a communication format, to receive the control message from the signaling processor, and to interwork the user communications between the communication format and asynchronous transfer mode cells that identify the selected virtual connection. The interworking unit transports the asynchronous transfer mode cells over the selected virtual connection.

The present invention further is directed to a system for allocating bandwidth for calls having call signaling and user communications. The system comprises a plurality of virtual paths each having bandwidth initially under-allocated thereto. The system also comprises a plurality of signaling processors linked together. Each signaling processor is adapted to re-allocate bandwidth for particular under-allocated virtual paths when the bandwidth initially allocated to the particular under-allocated virtual paths is not sufficient to connect the calls. The particular under-allocated virtual paths may use bandwidth initially allocated for other of the under-allocated virtual paths. Each signaling processor is adapted to process call signaling for calls to select connections over the particular under-allocated virtual paths, and to transport control messages that designate the selected connections. The system has a plurality of interworking units that are adapted to receive user communications for the calls, to receive control messages from the signaling processors, and to interwork the user communications to the selected connections on the under-allocated virtual paths. The system further includes a plurality of cross connects that are adapted to connect the interworking units through the selected connections on the under-allocated particular virtual paths.

Still further, the present invention is directed to a system for connecting a call in an asynchronous transfer mode system that has a plurality of virtual paths. Each virtual path has bandwidth initially under-allocated thereto. The call has call signaling and user communications. The system comprises a first signaling processor that is adapted to receive the call signaling and to process the call signaling to select a first connection over a selected first one of the under-allocated virtual paths. The first under-allocated virtual path has used all of the bandwidth initially allocated thereto. The first signaling processor transports a first control message that designates the selected first connection and transports a second control message that designates the selected first connection. The system also comprises a second signaling processor that is adapted to receive the first control message transported by the first signaling processor, to process the first control message to select a second connection for the user communications, and to transport a third control message designating the second connection. Also included is a bandwidth allocation platform that is adapted to track bandwidth usage by the plurality of under-allocated virtual paths and to identify the first under-allocated virtual path for under-allocation so that the first virtual path may use bandwidth initially allocated to another of the under-allocated virtual paths. The system further includes a first interworking unit that is adapted to receive the user communications in a communication format, to receive the second control message from the first signaling processor, and to interwork the user communications with the selected first connection over the first under-allocated virtual path. Further included is a second interworking unit that is adapted to receive the user communications interworked from the first interworking unit, to receive the third control message from the second signaling processor, and to interwork the user communication with the selected second connection.

Further still, the present invention is directed to a method for connecting a call over an ATM system having a plurality of ATM virtual paths. The ATM virtual paths have bandwidth initially under-allocated thereto. A plurality of ATM virtual path groups are included, and each virtual path group is configured to use a portion of the under-allocated virtual paths. The call has call signaling and user communications. A particular one of the under-allocated virtual paths in a particular one of the virtual path groups uses all of the bandwidth initially allocated thereto. The method comprises re-allocating the bandwidth for the particular under-allocated virtual path so that the particular virtual path may use bandwidth initially allocated for another under-allocated virtual path. The call signaling is received and processed to select a connection over the particular under-allocated virtual path in the particular virtual path group. The user communications are interworked with the selected connection.

Further yet, the present invention is directed to a method for connecting a call over an ATM system. The call has call signaling and user communications. The method comprises configuring a particular one of a plurality of ATM virtual paths for under-allocation of bandwidth so that as the particular ATM virtual path requires more bandwidth than allocated to connect the call, and the particular ATM virtual path uses the required bandwidth from another ATM virtual path. An ATM connection is configured over the particular ATM virtual path as a constant-bit rate connection. The call signaling is received and processed to select the ATM connection over the particular ATM virtual path to connect the call. The user communications are received over a TDM connection and interworked with the selected ATM connection as constant bit-rate traffic.

In addition, the present invention is directed to a method for connecting a call over an ATM system. The call has call signaling and user communications. The method comprises configuring a particular one of a plurality of ATM virtual paths for under-allocation of bandwidth so that as the particular ATM virtual path requires more bandwidth than allocated to connect the call, the particular ATM virtual path uses the required bandwidth from another ATM virtual path. An ATM connection is configured over the particular ATM virtual path as a constant-bit rate connection. The call signaling is received in a signaling processor and processed to select the ATM connection over the particular ATM virtual path to connect the call. A control message is transported from the signaling processor identifying the selected ATM connection. The user communications and the control message are received in an interworking unit over a TDM connection and interworked as constant bit-rate traffic with the selected ATM connection identified in the control message.

BRIEF DESCRIPTION OF THE DRAWINGS

FIG. 4 is a functional diagram of an asynchronous transfer mode interworking unit for use with a synchronous optical network system in accordance with the present invention.

FIG. 5 is a functional diagram of an asynchronous transfer mode interworking unit for use with a synchronous digital hierarchy system in accordance with the present invention.

FIG. 9 is a table diagram of a trunk circuit table used in the signaling processor of FIG. 7.

FIG. 10 is a table diagram of a trunk group table used in the signaling processor of FIG. 7.

FIG. 11 is a table diagram of an exception circuit table used in the signaling processor of FIG. 7.

FIG. 12 is a table diagram of an automated number index table used in the signaling processor of FIG. 7.

FIG. 13 is a table diagram of a called number screening table used in the signaling processor of FIG. 7.

FIG. 14 is a table diagram of a location routing number table used in the signaling processor of FIG. 7.

FIG. 15 is a table diagram of a called number table used in the signaling processor of FIG. 7.

FIG. 16 is a table diagram of a routing table used in the signaling processor of FIG. 7.

FIG. 17 is a table diagram of a treatment table used in the signaling processor of FIG. 7.

FIG. 18 is a table diagram of a message table used in the signaling processor of FIG. 7.

DETAILED DESCRIPTION

Figure 1:
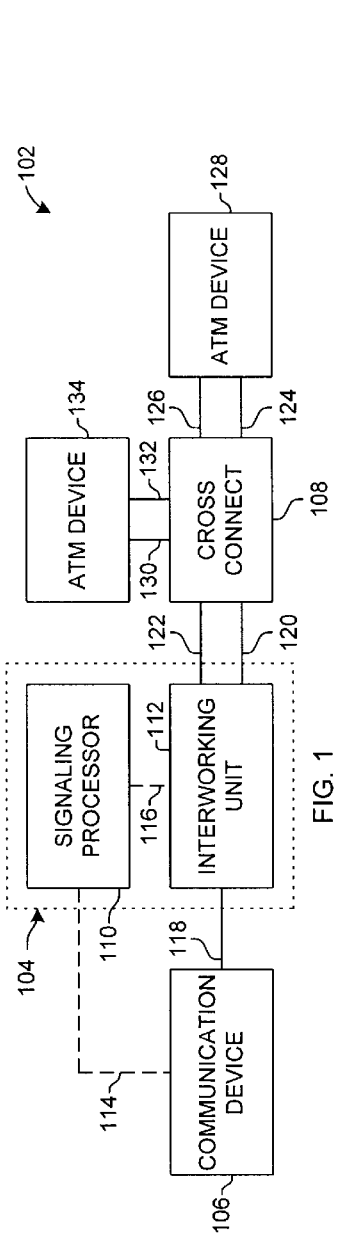
FIG. 1 is a block diagram of a processing system for under-allocating virtual connections in an asynchronous transfer mode system.

Telecommunication systems have a number of communication devices in local exchange and interexchange environments that interact to provide call services to customers. Both traditional and intelligent network (IN) services and resources are used to process, route, or connect a call to a designated connection.

A call has user communications and call signaling. The user communications contain the caller's information, such as a voice communication or data communication, and they are transported over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.933. A call can be connected to and from communication devices.

The present invention is used in an asynchronous transfer mode (ATM) system in which a caller can be connected from an origination point to a destination point by selecting a connection from the origination point to the destination point. The connection contains a virtual path (VP) and a virtual channel (VC). A VC is a logical connection between two end points for the transfer of ATM cells. A VP is a logical combination of VCs. VPs can be bundled into groups referred to herein as virtual path groups (VPGs). Because many ATM connections are uni-directional, bi-directional communications in an ATM system usually require companion VP/VCs.

The present invention manages bandwidth allocation in an ATM system to more efficiently utilize the capacity of virtual connections. The present invention allocates and tracks bandwidth for VPs within VPGs between ATM system devices. The system of the present invention under-allocates the VPs in a particular VPG so that when a particular VP requires more bandwidth, the particular VP may use bandwidth from another VP. With such under-allocation, cross-connect devices in the ATM system do not reserve an excessive amount of buffer space per VP, so that buffer space is available to other VPs. In effect, as a VP or VPG reaches the upper capacity for its critically allocated bandwidth, it may borrow available bandwidth from another VP or VPG.

Under-allocation refers to the amount of bandwidth allocated to a VP or to a VPG; an under-allocated VP has bandwidth equal to, or less than, a critically allocated VP. As used herein, when referring to bandwidth or VPs, the term "critically allocated" or "critical allocation" means that the VP bandwidth available in the system is fully allocated to VPGs between the system devices; the term does not directly refer to whether those critically allocated VPs are under-utilized, fully-utilized at 100% efficiency, or over-utilized so that they are congested.

It will be appreciated that the total bandwidth available in a system is divided so that a portion of the total bandwidth is allocated to each of the VPs in the VPGs to connect elements of the system. However, peak bandwidth usage for a first VPG that connects system elements normally is not at the same time as the peak bandwidth usage for a second VPG that connects other system elements. Thus, when the first VPG has reached peak usage, the first VPG may "borrow" bandwidth, such as VCs, from the second VPG which is below peak bandwidth usage. Similarly, VPs in a VPG may borrow VCs from other VPs in the same VPG. It is the bandwidth under-allocation and management by the bandwidth allocation system that controls this "borrowing."

FIG. 1 illustrates a telecommunication system 102 having a bandwidth allocation system 104 of the present invention. The bandwidth allocation system 104 allocates bandwidth between ATM system devices, primarily for constant bit rate (CBR) connections. Although, bandwidth also is allocated for connections for other traffic, such as variable bit rate (VBR) connections.

The availability of the VCs in VPs is dynamic. This means that the number of VCs that are available to be used by a VP at any one time may increase or decrease and is limited only by the availability of bandwidth.

The bandwidth allocation system 104 allocates bandwidth primarily for two areas: first, the VPs or VPGs between interworking units and ATM devices, such as between cross connects or ATM switches, and second, the VPs or VPGs between ATM devices and other ATM devices, such as between cross connects or ATM switches and other cross connects or other ATM switches. The VPs or VPGs are assigned so that they establish connections between the interworking units and all ATM devices in the system.

The bandwidth allocation system 104 under-allocates VPs using a primary method; although, more sophisticated techniques may be used, examples of which are described more completely below. In a primary method, each VP within a VPG is set at a certain amount of bandwidth, and system policing is turned off. By turning off policing, a VP may borrow bandwidth from another VP when needed and thereby accomplish dynamic reallocation of bandwidth. Thus, for example, the VPs in a VPG may be assigned a VP under-allocation value equivalent to 10 VCs in a critically allocated state. Because policing is turned off, when a VP uses all 10 of the VCs to which it is allocated, it may use a VC from another VP if available. Because the VPs in the VPG were under-allocated, only the appropriate amount of bandwidth was reserved in the buffers of cross connect devices in the system for particular VPs. Thus, the bandwidth may be borrowed from other VPs within the same VPG or from different VPGs, and those VPs may use the reallocated buffer space available in the cross connect devices.

The bandwidth allocation system 104 manages the traffic for both critically allocated and under-allocated bandwidth. The bandwidth allocation system 104 tracks usage of the bandwidth so that the VPs do not become overloaded and congested. Cell-loss and other loss of quality of service (QoS) will result from congestion.

The bandwidth allocation system 104 has four main bandwidth management (BM) functions for traffic control and QoS performance assurance. These functions allow the bandwidth allocation system 104 to monitor VPs and either prevent, or react to, overloading of VPs in a VPG. The BM functions include call admission control, usage parameter control/network parameter control, priority control, and congestion control.

Call admission control (CAC) determines at call setup whether to grant or to refuse a connection. If sufficient resources are available to connect a call, and if the call assignment for a connection does not affect QoS of the existing call connections, then the connection is granted. When multiple connections are required to setup a call, CAC separately checks each VP/VC and VPG for the call. CAC may receive operations, administration, and maintenance (OAM) information and process the OAM information to determine connection availability and to determine service and resource allocation and control.

Usage parameter control/network parameter control (UPC/NPC) is used to monitor and supervise traffic volume and ATM cell path validity for user communications over the VP/VCs. UPC/NPC thereby prevents abuse or damage of network resources from system elements that exceed or otherwise violate traffic parameters that are negotiated when a call is setup, such as the bandwidth and services required for the call. If a traffic parameter violation is identified, measures may be implemented to correct the violation. Some such measures include discarding ATM cells from the connection or removing the connection that contains the violator cells.

Priority control (PC) is used to prioritize traffic flow. Thus, connections may be made at different priority levels and over different connections in VPs or VPGs.

Congestion control (CC) is used to prevent overloaded and degraded QoS due to congested VPs or resources, to react to any congestion that occurs, and to react when signs of impending congestion are found. Congestion can arise when traffic flow changes unpredictably. CC methods include notifying CAC of congestion conditions or imminent congestion conditions, allocating resources more expeditiously, and forcing the bandwidth allocation system 104 to rearbitrate user parameters with the ATM devices.

The bandwidth allocation system 104 is connected to a communication device 106 and an ATM device, such as an ATM switch, an interworking unit, an ATM gateway, or a cross connect 108. The bandwidth allocation system 104 comprises a signaling processor 110 and an interworking unit 112.

The signaling processor 110 is linked to the communication device 106 through a link 114 and to the interworking unit 112 through a link 116. The interworking unit 112 is connected to the communication device 106 through a connection 118 and to the cross connect 108 through the connections 120 and 122. The connections 124 and 126 extend from the cross connect 108 to a first ATM device 128. The connections 130 and 132 extend from the cross connect 108 to a second ATM device 134. In this example, the connection 120 is provisioned to the connection 124, the connection 122 is provisioned to the connection 130, and the connection 126 is provisioned to the connection 132.

Those skilled in the art are aware that large networks have many more components than those that are shown in FIG. 1. For example, there typically may be a multitude of switches and communication devices connected through the bandwidth allocation system 104. Those skilled in the art will appreciate that a signal transfer point (STP) may be used to transfer signaling among the various components. The number of components shown on FIG. 1 has been restricted for clarity. The invention is fully applicable to a large network or a small network.

Connections are used to transport user communications and other device information between communication devices and between the elements and devices of the bandwidth allocation system 104. The term "connection" as used herein means the transmission media used to carry user communications between the first communication device 106 and the bandwidth allocation system 104 or between the elements of the bandwidth allocation system 104 and other elements of the telecommunication system 102, such as the ATM devices 128 and 134. For example, a connection could carry a user's voice, computer data, or other communication device data. A connection can be associated with either in-band communications or out-of-band communications.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as that used in SS7, C7, ISDN, DPNSS, B-ISDN, GR-303, or could be via local area network (LAN), or data bus call signaling. A link can be, for example, an AAL5 data link, UDP/IP, ethernet, DS0, or DS1. In addition, a link, as shown in the figures, can represent a single physical link or multiple links, such as one link or a combination of links of ISDN, SS7, TCP/IP, or some other data link. The term "control message" as used herein means a control or signaling message, a control or signaling instruction, or a control or signaling signal, whether proprietary or standardized, that conveys information from one point to another.

The communication device 106 comprises customer premises equipment (CPE), a service platform, a switch, a remote digital terminal, or any other device capable of initiating, handling, or terminating a call. CPE can be, for example, a telephone, a computer, a facsimile machine, or a private branch exchange. A service platform can be, for example, any enhanced computer platform that is capable of processing calls. A remote digital terminal is a device that concentrates analog twisted pairs from telephones and other like devices and converts the analog signals to a digital format known as GR-303.

The cross connect 108 is any device, such as an ATM cross connect or an ATM switch, that provisions virtual connections over virtual paths and virtual paths over physical connections, such as ATM connections over SONET paths in a SONET ring. The cross connect 108 provides a plurality of ATM virtual connections between the interworking unit 112 and the ATM devices 128 and 134. In ATM, virtual connections are designated by the identifiers in the cell header for a VP/VC. The cross connect 108 is configured to accept ATM cells from, and transport ATM cells to, the interworking unit 112 and the ATM devices 128 and 134.

The VCs differentiate individual calls on a VP in a VPG between the interworking unit 112 and the cross connect 108 or the ATM devices 128 and 134, and they identify, for example, the destination of the call. For example, VP/VC "A" for a VPG may be provisioned from the interworking unit 112, through the cross connect 108, and "destined" for another interworking unit connected to the first ATM device 128 over the connections 120 and 124. VP/VC "B" for the VPG may be provisioned from the interworking unit 112, through the cross connect 108, and "destined" for another interworking unit connected to the second ATM device 134 over the connections 122 and 130. An example of an ATM cross connect is the NEC Model 20.

The cross connect 108 may have buffers (not shown), where, for example, the cross connect is the cross connect fabric in an ATM switch. The buffers are configured to reserve the total amount of bandwidth allocated for a particular VP, such as with pooled buffers, or the buffers may be dynamic and not configured to reserve bandwidth for a particular VP or VPG, such as in localized or dedicated buffers. In an under-allocation system, the buffers preferably are pooled buffers that reserve bandwidth for particular VPs or VPGs.

The signaling processor 110 is a signaling platform that can receive and process call signaling. Based on the processed call signaling, the signaling processor 110 selects processing options, services, or resources for the user communications and generates and transmits control messages that identify the communication device, processing option, service, or resource that is to be used. The signaling processor 110 also selects virtual connections and circuit-based connections for call routing and generates and transports control messages that identify the selected connections. The signaling processor 110 can process various forms of signaling, including ISDN, GR-303, B-ISDN, SS7, and C7. A preferred signaling processor is discussed in detail below.

The signaling processor 110 manages the bandwidth allocation between system devices by configuring VPs for under-allocation and using the BM functions to prevent overloaded and degraded QoS due to congestion. Because the CAC and other BM functions are moved to the signaling processor 110 from the cross connect 108 and the ATM devices 128 and 134, the cross connect and the ATM devices are relieved from performing those functions.

This reduces or eliminates policing and simplifies processing required by the cross connect 108 and the ATM devices 128 and 134 so that the cross connect and ATM devices do not need to be able to provide significant processing or intelligent network (IN) functions. These ATM devices, such as ATM switches, are less expensive than other ATM devices that are needed for IN processing, such as ATM processing. In addition, the cross connect 108 and the ATM devices 128 and 134 can be independent of different vendor implementations for proprietary hardware and software configurations.

The interworking unit 112 interworks traffic between various protocols. Preferably, the interworking unit 112 interworks between ATM traffic and non-ATM traffic. The interworking unit 112 operates in accordance with control messages received from the signaling processor 110 over the link 116. These control messages typically are provided on a call-by-call basis and typically identify an assignment between a DS0 and a VP/VC for which user communications are interworked. In some instances, the interworking unit 112 may transport control messages which may include data.

The ATM devices 128 and 134 comprise CPE, a service platform, an ATM switch, a cross connect, an interworking unit, an ATM gateway, or any other device capable of initiating, handling, or terminating ATM cells for a call. A service platform can be, for example, any enhanced computer platform that is capable of processing calls. An ATM gateway is a device that changes ATM cell header VP/VC identifiers.

The ATM devices 128 and 134 may have buffers (not shown), where, for example, the ATM devices are ATM switches. The buffers are configured to reserve the total amount of bandwidth allocated for a particular VP or VPG, such as with pooled buffers, or the buffers may be dynamic and not configured to reserve bandwidth for a particular VP, such as in localized or dedicated buffers. In an under-allocation system, the buffers preferably are pooled buffers that reserve bandwidth for particular VPs or VPGs.

In the system of FIG. 1, the signaling processor 110 allocates bandwidth for VP under-allocation over the VPG connection 120 between the interworking unit 112 and the cross connect 108. VPs are configured either as under-allocated or as not under-allocated. As bandwidth becomes needed on a particular VP in the VPG connection 120, if bandwidth is available, the bandwidth is borrowed from another VP and given to the particular VP that requires the bandwidth.

The VPs between the cross connect 108 and the first ATM device 128 and between the cross connect 108 and the second ATM device 134 also may be under-allocated. For example, prior to call connections, the VPGs 124–126 and 130–132 leading from the cross connect 108 are configured for VP under-allocation. Particular VPs on the VPG 124 and 126 to the first ATM device 128 and particular VPs on the VPG 130 and 132 to the second ATM device 134 are under-allocated. Then, the signaling processor 110 selects connections in the VPs for the VPG 120 from the interworking unit 112 which will be cross connected by the cross connect 108 to other under-allocated VPs on, for example, the VPG 124. Because the VPs are provisioned through the cross connect 108, selecting a virtual connection for an under-allocated VP on the VPG 120 has the effect of selecting a virtual connection on the under-allocated VP on the VPG 124. Because the signaling processor 110 tracks VP/VC usage, the signaling processor can select VPs that are under-allocated through both the VPG 120 and the VPG 124, VPs that are under-allocated in the VPG 120 but not in the VPG 124, or VPs that are under-allocated in the VPG 124 but not in the VPG 120.

The bandwidth allocation system 104 of FIG. 1 operates as follows. The signaling processor 110 allocates the VPs available to each of the VPGs. For example, the connection 120 between the interworking unit 112 and the cross connect 108 and the connections 124–126 and 130–132 between the cross connect 108 and the ATM devices 128 and 134 are VPGs. In the under-allocation system, the VPG connections 120–126 and 130–132 each may be under-allocated, for example, and limited to 1000 VCs. When all 1000 VCs are consumed, the system can borrow bandwidth from another VPG, if needed.

The cross connect 108 reserves space in its buffers for 1000 VCs for each VPG connection 120–126 and 130–132 and provisions the under-allocated VPs for each VPG. Thus, 1000 VCs are provisioned between the interworking unit 112 and the second ATM device 134 through the VPG 122 and through the VPG 130. In addition, 1000 VCs are provisioned between the first ATM device 128 and the second ATM device 134 through the VPG 126 and through the VPG 132. For example, each VP may contain 100 VCs. Once the under-allocated state is reached, a VP can borrow bandwidth from another VP.

The communication device 106 transports a series of calls, all of which are destined for the first ATM device 128. In this instance, the communication device 106 is a TDM device, such as a private branch exchange (PBX), that is capable of transporting a plurality of calls such that a total of 1000 VCs are required to make connections for all of the calls. The call signaling is transported to the signaling processor 110, and the user communications are transported to the interworking unit 112. Typically, the call signaling is SS7 call signaling.

For each call, the signaling processor 110 receives the call signaling for the call over the link 114 and processes the call signaling to select a VC in the VP (VP/VC) for the VPG connection 120 that is provisioned, for example, through the VPG connection 124 to the first ATM device 128. The signaling processor 110 sends a control message to the interworking unit 112 over the link 116 identifying the selected VP/VC for the VPG connection 120 on which the user communications will be interworked for the call.

The interworking unit 112 receives the user communications from the communication device 106 for the call over the connection 118 and the control message from the signaling processor 110 over the link 116. The interworking unit 112 interworks the user communications between the TDM format and the ATM format. Therefore, the interworking unit 112 converts the user communications into ATM cells that identify the selected VP/VC within the VPG connection 120. The interworking unit 112 then transports the ATM cells over the selected VP/VC within the VPG connection 120.

The ATM cells for the call are handled by the cross connect 108. The cross connect 108 cross connects the ATM cells to the required VC on the VP within the VPG connection 124 to the first ATM device 128. The ATM device 128 receives the ATM cells.

This process is repeated for each of the series of calls until connections for all of the calls are made. When the level of bandwidth use for a VP within the VPG connection 124 reaches the level of under-allocation, bandwidth is pulled from other provisioned VPG connections, such as the VCs in the provisioned path from the second ATM device 134 to the first ATM device 128 through the VPG connections 126 and 132, to connect the calls. This bandwidth is used by the VPs in the VPG connection 124 which have been provisioned to the first ATM device 128.

Because the second ATM device 134 is not consuming any VCs in either of the VPG connections 122 and 130 or 126 and 132, and because the VPs available to the VPG connections 120 and 124 were under-allocated, thereby leaving buffer space in the cross connect 108 available for use by other VPGs with VPs, all of the connections are able to be made for all of the calls transported by the communication device 106. The above process would not have been possible in a critically allocated system without under-allocation where the critically allocated system has VPGs configured for 1000 VCs, and the call requiring the 1001th VC would have been rejected.

In the above example, bandwidth was borrowed from one VP within the VPG connection 126 because it was not being used, and it then was used to connect calls through another VPG connection 124 for which the VPs were under-allocated. It will be appreciated that bandwidth also may be borrowed from one VP and given to another VP within a single VPG.

The system of FIG. 1 operates as follows when a VP borrows bandwidth, such as VCs, from another VP within the same VPG. The signaling processor 110 under-allocates the bandwidth available to each of the VPs in the VPG. For example, a VPG 120 having 10 Mbps of total bandwidth may be configured for ten VPs, each allocated a fixed amount of 1 Mbps. Thus, the total assigned bandwidth is 10 Mbps.

The cross connect 108 provisions the under-allocated VPs for the VPG 120. Some of the VPs are provisioned between the interworking unit 112 and the first ATM device 128 through the VPG 120 and through the VPG 124. Other VPs are provisioned between the interworking unit 112 and the second ATM device 134 through the VPG 122 and through the VPG 130 or between the first interworking unit 128 and the second interworking unit 134 through the VPGs 126 and 132. Policing in the cross-connect 108 is turned off.

The communication device 106 transports a series of calls, all of which are destined for the first ATM device 128. The call signaling is transported to the signaling processor 110, and the user communications are transported to the interworking unit 112. Typically, the call signaling is SS7 call signaling.

For each call, the signaling processor 110 receives the call signaling for the call over the link 114 and processes the call signaling to select a VC in the VP (VP/VC) for the VPG connection 120 that is provisioned, for example, to the first ATM device 128 through the VPG connection 124. The signaling processor 110 sends a control message to the interworking unit 112 over the link 116 identifying the selected VP/VC for the VPG connection 120 on which the user communications will be interworked for the call.

The interworking unit 112 receives the user communications from the communication device 106 for the call over the connection 118 and the control message from the signaling processor 110 over the link 116. The interworking unit 112 interworks the user communications to ATM cells that identify the selected VP/VC within the VPG connection 120. The interworking unit 112 then transports the ATM cells over the selected VP/VC within the VPG connection 120.

The ATM cells for the call are handled by the cross connect 108. The cross connect 108 cross connects the ATM cells to the required VP/VC on the VPG connection 124 to the first ATM device 128. The ATM device 128 receives the ATM cells.

This process is repeated for each of the series of calls until the VP on which the calls are transported uses bandwidth up to the level of under-allocation. Then, for the next call, because policing is turned off, the VP uses bandwidth from a second VP in the VPG 120 and in the VPG 124 if the second VP is not using all of its bandwidth. Because the VPs were under-allocated, not all of the available buffer space in the cross connect 108 was used by the second VP in the VPG, and this buffer space then is used by the first VP when connecting the particular call. This process is repeated for the other calls.

Figure 2:
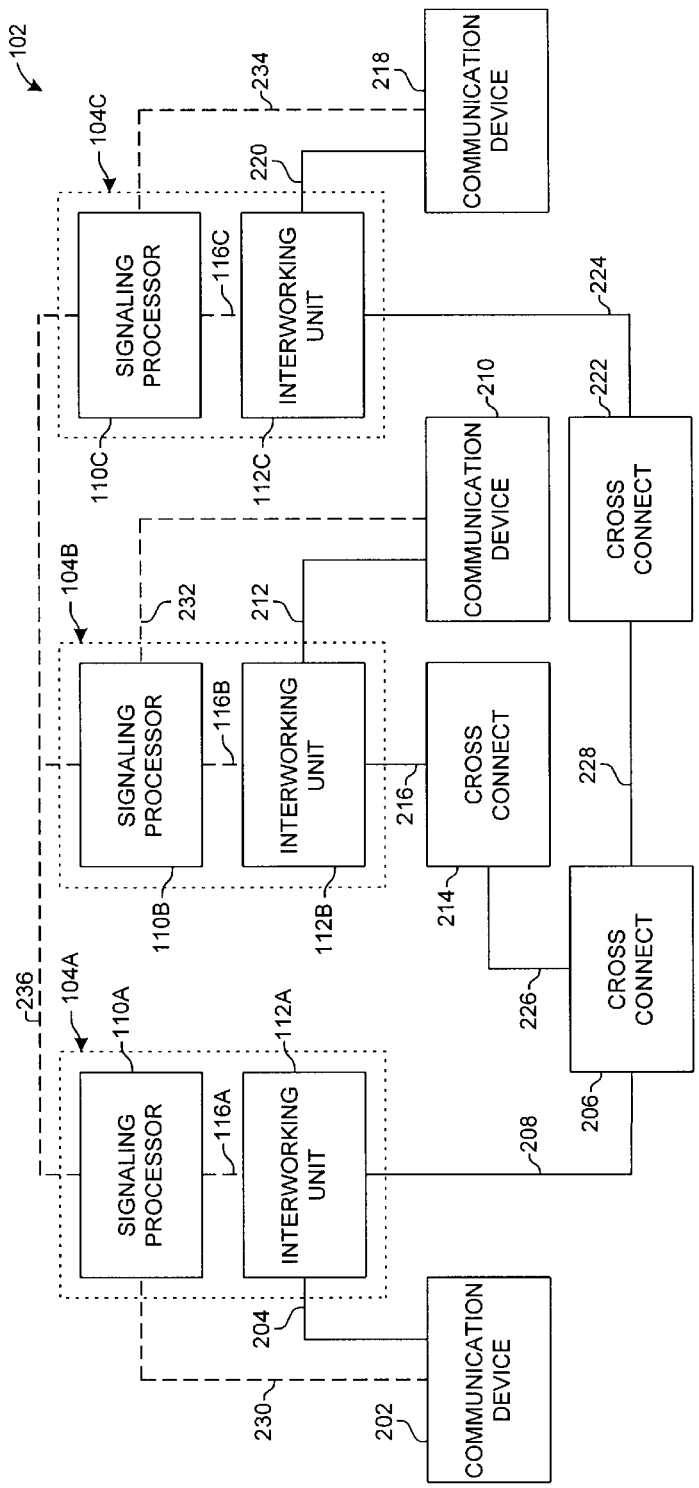
FIG. 2 is a block diagram of a processing system for using signaling processors to allocate virtual connections for virtual connection under-allocation in an asynchronous transfer mode system between interworking units.

FIG. 2 illustrates the telecommunication system 102 in which bandwidth is allocated and managed through cooperation of several bandwidth allocation systems. FIG. 2 illustrates a first bandwidth allocation system 104A comprising a first signaling processor 110A and a first interworking unit 112A linked by a link 116A, a second bandwidth allocation system 104B comprising a second signaling processor 110B and a second interworking unit 112B linked by a link 116B, and a third bandwidth allocation system 104C comprising a third signaling processor 110C and a third interworking unit 112C linked by a link 116C. Each of the components of the bandwidth allocation systems 104A, 104B, and 104C are the same as the components of the bandwidth allocation system 104 of FIG. 1.

The first interworking unit 112A is connected to a first communication device 202 through a connection 204 and to a first cross connect 206 through a connection 208. The second interworking unit 112B is connected to a second communication device 210 through a connection 212 and to a second cross connect 214 through a connection 216. The third interworking unit 112C is connected to a third communication device 218 through a connection 220 and to a third cross connect 222 through a connection 224. A connection 226 connects the first and second cross connects 206 and 214, and a connection 228 connects the first and third cross connects 206 and 228.

Each of the communication devices 202, 210, and 218 are the same components as the communication device 106 of FIG. 1. Each of the cross connects 206, 214, and 222 provide the same function as the cross connect 108 of FIG. 1.

A link 230 links the first communication device 202 to the first signaling processor 110A, a link 232 links the second communication device 210 to the second signaling processor 110B, and a link 234 links the third communication device 218 to the third signaling processor 110C. A link 236 links each of the first signaling processor 110A, the second signaling processor 110B, and the third signaling processor 110C to each other.

The bandwidth allocation systems 104A, 104B, and 104C manage VP allocation and usage by VPGs on a point code basis. There is a relationship established for connections at the point code level between the devices in the telecommunication system 102. This allows each of the bandwidth allocation systems 104A, 104B, and 104C to track the established connections between themselves and other devices in the telecommunication system 102, such as with the other bandwidth allocation systems.

The bandwidth allocation systems 104A, 104B, and 104C may function in a restrictive routing control (RRC) mode or in an expansive routing control (ERC) mode. Each of the RRC and the ERC is used to track bandwidth allocation of VP/VC assignments for VPGs to determine the current usage and availability of VP/VCs. Expansive and restrictive controls are reactions to full routes. Restrictive controls stop calls. Expansive controls find another route for the call or "expand" the current route by requesting more bandwidth. It will be appreciated that the RRC and the ERC are BM functions that may be configured, implemented, and controlled by the signaling processors 110A, 110B, and 110C of the bandwidth allocation systems 104A, 104B, and 104C.

The bandwidth allocation systems 104A, 104B, and 104C may use RRC to track connection relationships and VP/VC usage over VPGs between themselves and the other system devices, such as the cross connects 206, 214, and 222. The bandwidth allocation systems 104A, 104B, and 104C use RRC to under-allocate and track the bandwidth available to a VP for connections to other bandwidth allocation systems. However, with RRC, the bandwidth allocation systems 104A, 104B, and 104C do not track VP usage and allocation of the other bandwidth allocation systems. Therefore, use of additional bandwidth for under-allocated VPs for any such VPG may be restricted to a fixed amount so that all of the available bandwidth in the system is not consumed on a single VPG, thereby preventing possible overloaded or degraded QoS. As a result, if a VP or VPG reaches the fixed amount of bandwidth above the level of under-allocation for that VP or VPG, then the VP or VPG may not use more bandwidth even if it is available in the system.

The bandwidth allocation systems 104A, 104B, and 104C may use ERC to use all available bandwidth. With ERC, a VPG is not limited to using a fixed amount of bandwidth over the under-allocated VPs. In ERC, the bandwidth allocation systems 104A, 104B, and 104C track the VP/VC assignments and usage for VPGs between themselves and all other devices, and between every other bandwidth allocation system in the telecommunication system 102 and all other devices. Because the bandwidth allocation systems 104A, 104B, and 104C track all VP/VC assignments for all VPGs in the telecommunication system 102, the bandwidth allocation systems are able to dynamically determine if bandwidth is available for use and to dynamically allocate that bandwidth. By using ERC, the bandwidth allocation systems 104A, 104B, and 104C may completely use all available bandwidth while having a lower risk of overloaded and degraded QoS due to congestion.

If a bandwidth allocation system 104A, 104B, and 104C is operating in the ERC mode, VP/VC usage tracking may occur in a variety of methods. The signaling processors 110A, 110B, and 110C may query the other signaling processors to determine which VP/VCs have been allocated for usage. Also, the signaling processors 110A, 110B, and 110C may automatically transmit control messages to the other signaling processors when a VP/VC is used and again when the VP/VC is disassociated. A VP/VC is disassociated when the connection is disconnected, such as, for example, when the call is complete. In addition, the signaling processors 110A, 110B, and 110C may request information from the other signaling processors only when a threshold amount of the total bandwidth available for the under-allocated VPs for use with its bandwidth allocation system 104A, 104B, or 104C is reached or when the under-allocation level is reached.

The system of FIG. 2 operates as follows for calls to be connected between the first communication device 202 and the third communication device 218 in which the first bandwidth allocation system 104A is configured to use ERC. In addition, for the present example, with under-allocation, each VPG is limited to 500 VCs. Thus, although a maximum number of 500 VCs may not be exceeded when the telecommunication network 102 is congested, at times when the telecommunication network is not congested, this maximum number may be exceeded.

The first communication device 202 transports a series of calls, all of which are destined for the third communication device 218. In this instance, the first communication device 202 is a TDM device, such as a PBX, that is capable of transporting a plurality of calls. The call signaling for each call is transported to the first signaling processor 110A, and the user communications for each call are transported to the first interworking unit 112A. Typically, the call signaling is SS7 call signaling.

For each call, the first signaling processor 110A receives call signaling for a call over the link 230 and processes the call signaling to select a VC in a VP (VP/VC) for the VPG connection 208 that is provisioned, for example, to the third interworking unit 112C. The first signaling processor 110A sends a control message to the first interworking unit 112A over the link 116A identifying the selected VP/VC within the VPG connection 208 on which the user communications will be interworked. In addition, the first signaling processor 110A transports a control message to the third signaling processor designating the selected VP/VC within the VPG connection 224 and that the call is to be connected to the third communication device 218.

The third signaling processor 110C receives the control message from the first signaling processor 110A over the link 236 and processes it. The third signaling processor 110C determines, from the control message, that the user communications will be received by the third interworking unit 112C. The third signaling processor 110C selects a second connection 220 with which the user communications are to be interworked by the third interworking unit 112C from the VP/VC within the VPG connection 224. The selected second connection 220 is a TDM connection to the third communication device 218. The third signaling processor 110C transports a control message over the link 234 to the third interworking unit 112C over the link 116C designating the selected second connection 220. In addition, the third signaling processor 110C transports call signaling to the third communication device 218 over the link 234 for the call connection.

The first interworking unit 112A receives the user communications for the call from the first communication device 202 over the connection 204 and the control message from the first signaling processor 110A over the link 116A. The first interworking unit 112A interworks the user communications between the TDM format and the ATM format. Therefore, the first interworking unit 112A converts the user communications into ATM cells that identify the selected VP/VC within the VPG connection 208. The first interworking unit 112A then transports the ATM cells over the selected VP/VC within the VPG connection 208.

The ATM cells for the call are handled by the first cross connect 206. The first cross connect 206 cross connects the ATM cells to the provisioned VP/VC on the VPG connection 228 to the second cross connect 222. Likewise, the second cross connect 222 handles the ATM cells from VP/VC within the VPG connection 228 and cross connects the ATM cells to the provisioned VP/VC on the VPG connection 224 destined for the third interworking unit 112C.

The third interworking unit 112C receives the ATM cells over the VP/VC within the VPG connection 224 and receives the control message from the third signaling processor 110C over the link 116C. The third interworking unit 112C interworks the ATM cells to the second selected connection 220 designated by the control message, thereby transporting the user communications to the third communication device 218 over the connection 220 for the call connection. Preferably, the user communications are transported to a third communication device 218 in a TDM format.

This process is repeated for each of the series of calls until the number of VCs in use by the first bandwidth allocation system 104A over the VPs in the VPG 208 and the VPG 228 approaches the under-allocation level of 500 VCs. Then, in the present example, for the next connection, the first signaling processor 110A transports a control message to the second and third signaling processors 110B and 110C over the link 236 to determine if the bandwidth that is allocated to other connections is available for use.

In this example, the VCs allocated for the other VPs of the VPGs in the telecommunication system 120 are under-utilized and, therefore, may be used by the first bandwidth allocation system 104A. In addition, because the cross connects 206 and 222 have space reserved in the buffers for the amount of under-allocated bandwidth, and not all of the buffer space is in use, the buffer space is available for use in the cross connects for the under-allocated VPs that need to connect calls beyond the originally allocated bandwidth. This buffer space then can be borrowed by a particular VP to connect the particular call.

The second and third signaling processors 110B and 110C each transport to the first signaling processor 110A over the link 236 a control message having information about the availability of the VCs. This request by the first signaling processor 110A and the responses by the second and third signaling processors 110B and 110C occur in real-time.

The first signaling processor 110A receives the control messages from the second and third signaling processors 110B and 110C over the link 236. The first signaling processor 110A processes the control messages and, because there is no impact on QoS for other calls on VCs from the second and third bandwidth systems 104B and 104C if the first bandwidth allocation system 104A uses the VCs, the first signaling processor 110A determines that it may use the VCs for the next calls. If, however, congestion would occur if the first bandwidth allocation system 104A uses VCs allocated for VPs from the second and third bandwidth allocation systems 104B and 104C, then the signaling processor 110A will deny the connection for the next call and not use the VCs allocated for VPs from the second and third bandwidth allocation systems.

The first signaling processor 110A uses the VCs from the other VP to connect the remaining calls over the VP in the VPGs 208, 228, and 224 as described above. This causes under-allocated VPs which were not being utilized to be selected and used in the VPGs 208, 228, and 224.

Figure 3:
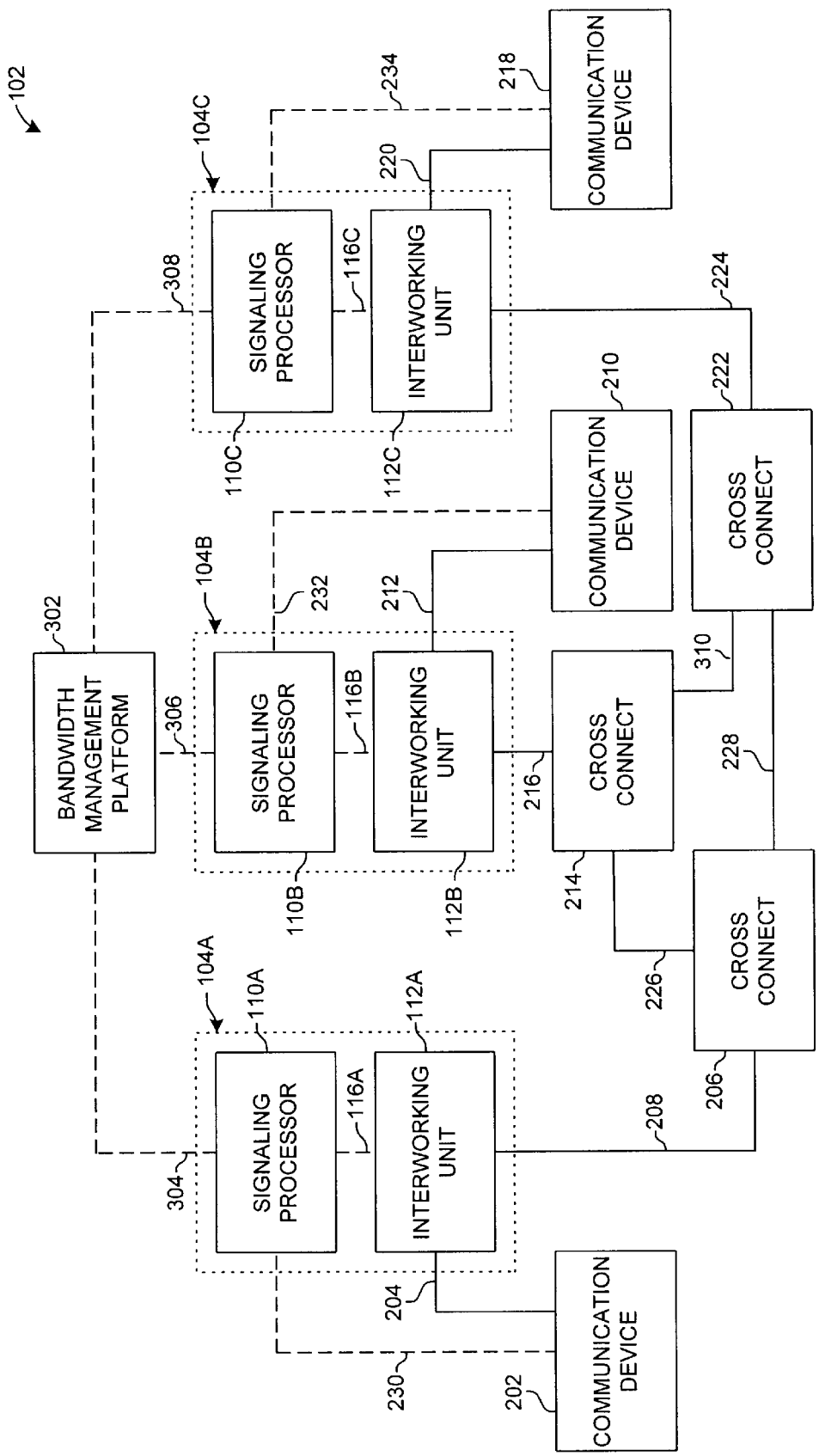
FIG. 3 is a block diagram of a processing system for using a bandwidth management platform to allocate virtual connections for virtual connection under-allocation in an asynchronous transfer mode system between interworking units.

FIG. 3 illustrates a version of the present invention in which a bandwidth management platform is used for bandwidth allocation management. Each of the first signaling processor 110A, the second signaling processor 110B, and the third signaling processor 110C are linked to the bandwidth management platform 302 through a link 304, 306, and 308, respectively. Because both call signaling processing and bandwidth allocation and management are processor-intensive in that they require significant processing power, processing efficiencies are increased by adding the central bandwidth management platform 302 and allowing the signaling processors 110A, 110B, and 110C to perform the call signaling processing and connection selections.

In a first embodiment of the system with the bandwidth allocation platform, all of the functions required for the bandwidth allocation, including ERC, and bandwidth management, including the CAC, UPC/NPC, PC, and CC functions, are moved to a central bandwidth management platform 302. In some instances, ERC functions will remain in the signaling processors 110A, 110B, and 110C. Because the VP allocation, tracking processing, and bandwidth management is in a central location, these functions are not performed redundantly by each signaling processor 110A, 110B, and 110C.

The first embodiment of the system of FIG. 3 operates similarly to the system of FIG. 2. However, after each of the signaling processors 110A, 110B, and 110C uses a VP/VC, the signaling processor transports a control message to the bandwidth management platform 302 over the links 304, 306, and 308, respectively. As the bandwidth management systems 104A, 104B, and 104C reach the maximum under-allocated bandwidth for their VPGs, the respective signaling processors 110A, 110B, and 110C may request additional bandwidth to be allocated by the bandwidth management platform 302.

In addition, the bandwidth management platform 302 may anticipate the need by one of the bandwidth management systems 104A, 104B, and 104C and transport a control message to that bandwidth management system and allocate VPs above the under-allocation level if this will not cause congestion on the ATM system. Moreover, the bandwidth management platform 302 may anticipate VP requirements for another bandwidth management system 104A, 104B, 104C and deny a request from another bandwidth management system. Also, the bandwidth management platform 302 may be configured to prioritize either actual requests for allocation in under-allocated systems or anticipated requests for allocation in under-allocated systems of VPs by the bandwidth management systems 104A, 104B, and 104C.

It will be appreciated that the bandwidth management platform 302 may reroute a call over a connection if a VC or a VP is needed for a call, if congestion on a path for a VPG is imminent. For example, a connection 310 may extend between the second cross connect 214 and the third cross connect 222. A connection is made for a call between the first interworking unit 112A and the third interworking unit 112C through a VP in the VPG connection 228. If the VPG connection 228 becomes congested, then the bandwidth management platform 302 may reroute the call from the first cross connect 206 to the second cross connect 214 over the VPG connection 226, and from the second cross connect 214 to the third cross connect 222 over the VPG connection 310.

In a second embodiment of the bandwidth management platform 302, many of the BM functions, such as CAC, UPC/NPC, PC, and CC functions, are still performed by the signaling processors 110A, 110B, and 110C. The bandwidth management platform 302 is provided information about the VP usage by the bandwidth allocation systems 104A, 104B, and 104C, and information regarding where the call is to be connected. The bandwidth management platform 302 processes this information and determines which VPs are available for use and which VPs may be assigned to under-allocated systems. The bandwidth management platform 302 transmits this VP availability information to the requesting signaling processor 110A, 110B, or 110C, and the signaling processor selects the appropriate connection, if necessary. The signaling processors 110A, 110B, and 110C provide the CAC functions and other BM functions to control congestion. In this instance, the VP tracking processing is in a central location, and this function is not performed redundantly by each signaling processor 110A, 110B, and 110C.

THE ATM INTERWORKING UNIT

FIG. 4 shows one embodiment of an interworking unit which is an ATM interworking unit 402 suitable for the present invention for use with a SONET system, but other interworking units that support the requirements of the invention also are applicable. The ATM interworking unit 402 may receive and transmit in-band and out-of-band calls.

The ATM interworking unit 402 preferably has a control interface 404, an C-N/STS-N interface 406, a DS3 interface 408, a DS1 interface 410, a DS0 interface 412, a signal processor 414, an ATM adaptation layer (AAL) 416, an OC-M/STS-M interface 418, and an ISDN/GR-303 interface 420. As used herein in conjunction with OC or STS, "N" refers to an integer, and "M" refers to an integer.

The control interface 404 receives control messages originating from the signaling processor 422, identifies DSO and virtual connection assignments in the control messages, and provides these assignments to the AAL 416 for implementation. The control messages are received over an ATM virtual connection and through the OC-M/STS-M interface 418 to the control interface 404 or directly through the control interface from a link.

The OC-N/STS-N interface 406, the DS3 interface 408, the DS1 interface 410, the DS0 interface 412, and the ISDN/GR-303 interface 420 each can receive user communications from a communication device 424. Likewise, the OC-M/STS-M interface 418 can receive user communications from a communication device 426.

The OC-N/STS-N interface 406 receives OC-N formatted user communications and STS-N formatted user communications and converts the user communications to the DS3 format. The DS3 interface 408 receives user communications in the DS3 format and converts the user communications to the DS1 format. The DS3 interface 408 can receive DS3s from the OC-N/STS-N interface 406 or from an external connection. The DS1 interface 410 receives the user communications in the DS1 format and converts the user communications to the DS0 format. The DS1 interface 410 receives DS1s from the DS3 interface 408 or from an external connection. The DS0 interface 412 receives user communications in the DS0 format and provides an interface to the AAL 416. The ISDN/GR-303 interface 420 receives user communications in either the ISDN format or the GR-303 format and converts the user communications to the DS0 format. In addition, each interface may transmit user communications in like manner to the communication device 424.

The OC-M/STS-M interface 418 is operational to receive ATM cells from the AAL 416 and to transmit the ATM cells over the connection to the communication device 426. The OC-M/STS-M interface 418 also may receive ATM cells in the OC or STS format and transmit them to the AAL 416.

The AAL 416 comprises both a convergence sublayer and a segmentation and reassembly (SAR) sublayer. The AAL 416 obtains the identity of the DS0 and the ATM VP/VC from the control interface 404. The AAL 416 is operational to convert between the DS0 format and the ATM format. AALs are known in the art, and information about AALs is provided by International Telecommunications Union (ITU) document 1.363, which is incorporated herein by reference. An AAL for voice calls is described in U.S. Pat. No. 5,606,553 entitled "Cell Processing for Voice Transmission" which is incorporated herein by reference.

Calls with multiple 64 Kilo-bits per second (Kbps) DS0s are known as N×64 calls. If desired, the AAL 416 can be configured to accept control messages through the control interface 404 for N×64 calls. The ATM interworking unit 402 is able to interwork, multiplex, and demultiplex for multiple DS0s. A technique for processing VP/VCs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

In some embodiments, it may be desirable to incorporate digital signal processing capabilities at the DS0 level. It may also be desired to apply echo cancellation to selected DS0 circuits. In these embodiments, a signal processor 414 is included either separately (as shown) or as a part of the DS0 interface 412. The signaling processor 422 is configured to send control messages to the ATM interworking unit 402 to implement particular features on particular DS0 circuits. Alternatively, lookup tables may be used to implement particular features for particular circuits or VP/VCs.

FIG. 5 shows another embodiment of an interworking unit which is an ATM interworking unit 502 suitable for the present invention for use with an SDH system. The ATM interworking unit 502 preferably has a control interface 504, an STM-N electrical/optical (E/O) interface 506, an E3 interface 508, an E1 interface 510, an E0 interface 512, a signal processor 514, an AAL 516, an STM-M electrical/optical (E/O) interface 518, and a digital private network signaling system (DPNSS) interface 520. As used herein in conjunction with STM, "N" refers to an integer, and "M" refers to an integer.

The control interface 504 receives control messages from the signaling processor 522, identifies E0 and virtual connection assignments in the control messages, and provides these assignments to the AAL 516 for implementation. The control messages are received over an ATM virtual connection and through the STM-M interface 518 to the control interface 404 or directly through the control interface from a link.

The STM-N E/O interface 506, the E3 interface 508, the E1 interface 510, the E0 interface 512, and the DPNSS interface 520 each can receive user communications from a second communication device 524. Likewise, the STM-M E/O interface 518 can receive user communications from a third communication device 526.

The STM-N E/O interface 506 receives STM-N electrical or optical formatted user communications and converts the user communications from the STM-N electrical or STM-N optical format to the E3 format. The E3 interface 508 receives user communications in the E3 format and converts the user communications to the E1 format. The E3 interface 508 can receive E3 s from the STM-N E/O interface 506 or from an external connection. The E1 interface 510 receives the user communications in the E1 format and converts the user communications to the E0 format. The E1 interface 510 receives E1 s from the STM-N E/O interface 506 or the E3 interface 508 or from an external connection. The E0 interface 512 receives user communications in the E0 format and provides an interface to the AAL 516. The DPNSS interface 520 receives user communications in the DPNSS format and converts the user communications to the E0 format. In addition, each interface may transmit user communications in a like manner to the communication device 524.

The STM-M E/O interface 518 is operational to receive ATM cells from the AAL 516 and to transmit the ATM cells over the connection to the communication device 526. The STM-M E/O interface 518 may also receive ATM cells in the STM-M E/O format and transmit them to the AAL 516.

The AAL 516 comprises both a convergence sublayer and a segmentation and reassembly (SAR) sublayer. The AAL obtains the identity of the E0 and the ATM VP/VC from the control interface 504. The AAL 516 is operational to convert between the E0 format and the ATM format, either in response to a control instruction or without a control instruction. AAL's are known in the art. If desired, the AAL 516 can be configured to receive control messages through the control interface 504 for N×64 user communications.

E0 connections are bi-directional and ATM connections typically are uni-directional. As a result, two virtual connections in opposing directions typically will be required for each E0. Those skilled in the art will appreciate how this can be accomplished in the context of the invention.

In some instances, it may be desirable to incorporate digital signal processing capabilities at the E0 level. Also, it may be desirable to apply echo cancellation. In these embodiments, a signal processor 514 is included either separately (as shown) or as a part of the E0 interface 512. The signaling processor 522 is configured to send control messages to the ATM interworking unit 502 to implement particular features on particular circuits. Alternatively, lookup tables may be used to implement particular features for particular circuits or VP/VCs.

THE SIGNALING PROCESSOR

The signaling processor receives and processes telecommunications call signaling, control messages, and customer data to select connections that establish communication paths for calls. In the preferred embodiment, the signaling processor processes SS7 signaling to select connections for a call. Call processing in the call processor and the associated maintenance that is performed for call processing is described in a U.S. Patent Application entitled "System and Method for Treating a Call for Call Processing" filed on the same date as this application, which is assigned to the same assignee as this patent application, and which is incorporated herein by reference.

In addition to selecting connections, the signaling processor performs many other functions in the context of call processing. It not only can control routing and select the actual connections, but it also can validate callers, control echo cancelers, generate accounting information, invoke intelligent network functions, access remote databases, manage traffic, and balance network loads. One skilled in the art will appreciate how the signaling processor described below can be adapted to operate in the above embodiments.

Figure 6:
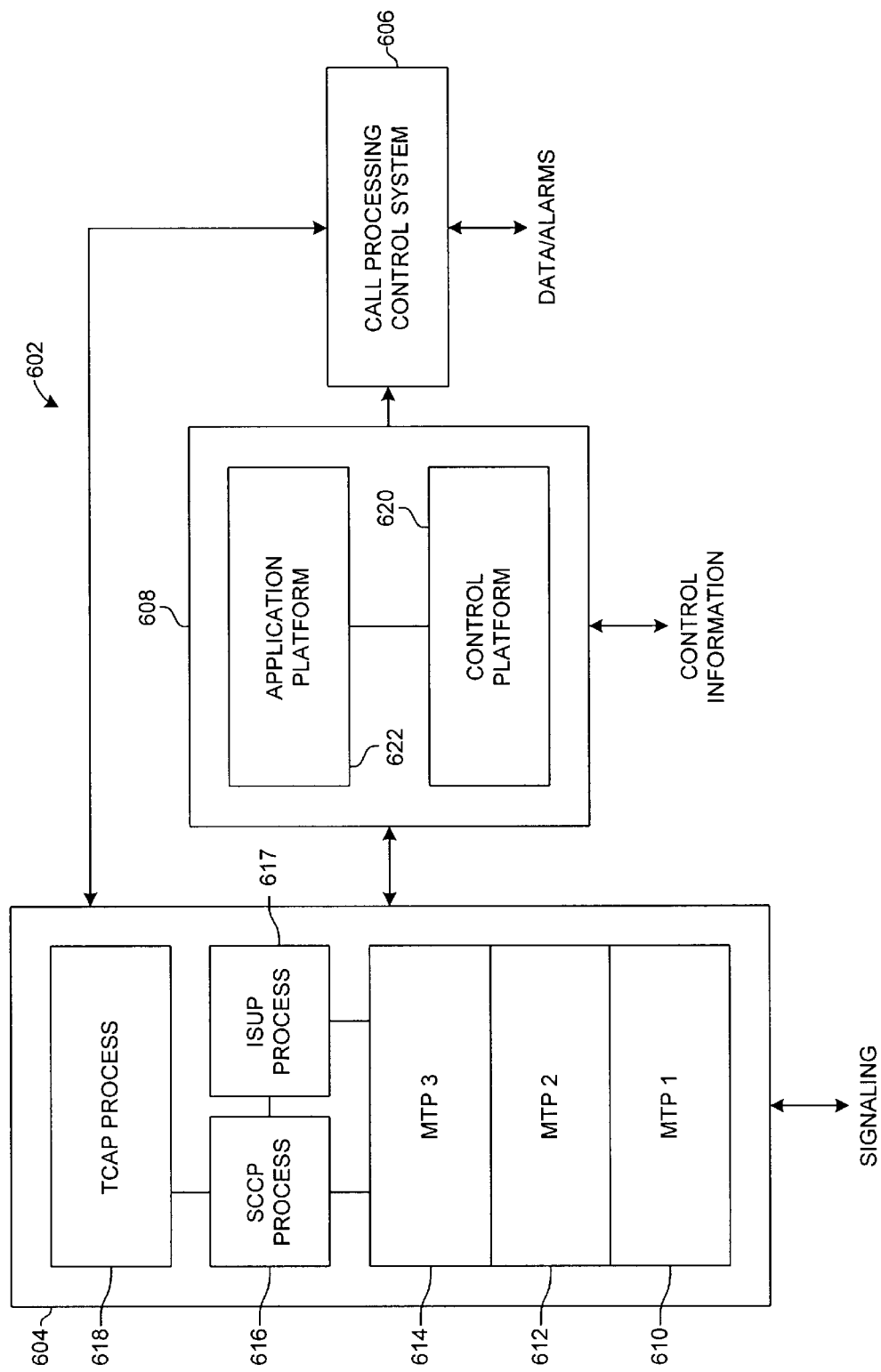
FIG. 6 is a block diagram of a signaling processor constructed in accordance with the present system.

FIG. 6 depicts an embodiment of the signaling processor. Other versions also are contemplated. In the embodiment of FIG. 6, the signaling processor 602 has a signaling interface 604, a call processing control system 606 (CPCS), and a call processor 608. It will be appreciated that the signaling processor 602 may be constructed as modules in a single unit or as multiple units.

The signaling interface 604 is coupled externally to signaling systems—in particular to signaling systems having a message transfer part (MTP), an ISDN user part (ISUP), a signaling connection control part (SCCP), an intelligent network application part (INAP), and a TCAP. The signaling interface 604 preferably is a platform that comprises an MTP level 1 610, an MTP level 2 612, and MTP level 3 614, an SCCP process 616, an ISUP process 617, and a TCAP process 618. The signaling interface 604 also has INAP functionality.

The signaling interface 604 may be linked to a communication device (not shown). For example, the communication device may be an SCP which is queried by the signaling interface with an AIN 0.1 SCP TCAP query to obtain additional call-associated data. The answer message may have additional information parameters that are required to complete call processing. The communication device also may be an STP or other device.

The signaling interface 604 is operational to transmit, process, and receive call signaling. The TCAP, SCCP, ISUP, and INAP functionality use the services of MTP to transmit and receive the messages. Preferably, the signaling interface 604 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGM&S company).

The processes of the signaling interface 604 process information that is received in message signal units (MSUs) and convert the information to call information elements that are sent to the call processor 608 to be processed. A call information element may be, for example, an ISUP IAM message parameter from the MSU. The signaling interface 604 strips the unneeded header information from the MSU to isolate the message information parameters and passes the parameters to the call processor 608 as the call information elements. Examples of these parameters are the called number, calling number, and user service information. Other examples of messages with information elements are an ANM, an ACM, an REL, an RLC, and an INF. In addition, call information elements are transferred from the call processor 608 back to the signaling interface 604, and the information elements are reassembled into MSUs and transferred to a signaling point.

The CPCS 606 is a management and administration system. The CPCS 606 is the user interface and external systems interface into the call processor 608. The CPCS 606 serves as a collection point for call-associated data such as translations having call routing data, logs, operational measurement data, statistical information, accounting information, and other call data.

The CPCS 606 accepts data, such as the translations, from a source such as an operations system and updates the data in the tables in the call processor 608. The CPCS 606 makes sure this data is in the correct format prior to transferring the data to the call processor 608. The CPCS 606 also provides configuration data to other devices including to the call processor 608, the signaling interface 604, and the interworking unit (not shown). In addition, the CPCS 606 provides for remote control of call monitoring and call tapping applications from the call processor 608.

The CPCS 606 also serves as a collection point for alarms. Alarm information is transferred to the CPCS 606. The CPCS 606 then transports alarm messages to the required communication device. For example, the CPCS 606 can transport alarms to an operations center.

The CPCS 606 also has a human-machine interface (HMI). This allows a person to log onto the CPCS 606 and manage data tables or review data tables in the CPCS or provide maintenance services.

The call processor 608 processes call signaling and controls an ATM interworking unit, such as an ATM interworking multiplexer (mux) that performs interworking of DS0s and VP/VCs. However, the call processor 608 may control other communications devices and connections in other embodiments.

The call processor 608 comprises a control platform 620 and an application platform 622. Each platform 620 and 622 is coupled to the other platform.

The control platform 620 is comprised of various external interfaces including an interworking unit interface, an echo interface, a resource control interface, a call information interface and an operations interface. The control platform 620 is externally coupled to an interworking unit control, an echo control, a resource control, accounting, and operations. The interworking unit interface exchanges messages with at least one interworking unit. These messages comprise DS0 to VP/VC assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The call information interface transfers pertinent call information to a call information processing system, such as to the CPCS 606. Typical call information includes accounting information, such as the parties to the call, time points for the call, and any special features applied to the call. One skilled in the art will appreciate how to produce the software for the interfaces in the control platform 620.

The application platform 622 processes signaling information from the signaling interface 604 to select connections. The identity of the selected connections are provided to the control platform 620 for the interworking unit interface. The application platform 622 is responsible for validation, translation, routing, call control, exceptions, screening, and error handling. In addition to providing the control requirements for the interworking unit, the application platform 622 also provides requirements for echo control and resource control to the appropriate interface of the control platform 620. In addition, the application platform 622 generates signaling information for transmission by the signaling interface 604. The signaling information might be for ISUP, INAP, or TCAP messages to external network elements. Pertinent information for each call is stored in a call buffer information (CBI) location for the call. The CBI can be used for tracking and accounting the call.

The application platform 622 preferably operates in general accord with the Basic Call Model (BCM) defined by the ITU. An instance of the BCM is created to handle each call. The BCM includes an originating process and a terminating process. The application platform 622 includes a service switching function (SSF) that is used to invoke the service control function (SCF). Typically, the SCF is contained in an SCP. The SCF is queried with TCAP or INAP messages transported by the signaling interface 604 which are initiated with information from the SSF in the application platform 622. The originating or terminating processes will access remote databases with intelligent network (IN) functionality via the SSF.

Software requirements for the application platform 622 can be produced in specification and description language (SDL) defined in ITU-T Z.100. The SDL can be converted into C code. A real time case tool such as SDT from Telelogic, Inc. or Object Time from Object Time, Inc. can be used. Additional C and C++ code can be added as required to establish the environment.

The call processor 608 can be comprised of the above-described software loaded onto a computer. The computer can be a Tandem S4000 using the non-stop Unix operating system and conventional database systems. It may be desirable to utilize the multi-threading capability of a Unix operating system.

From FIG. 6, it can be seen that the application platform 622 processes signaling information to control numerous systems and facilitate call connections and services. The SS7 signaling is exchanged between the call processor 608 and external components through the signaling interface 604, and control information is exchanged with external systems through the control platform 620. Advantageously, the signaling interface 604, the CPCS 606, and the call processor 608 are not integrated into a switch central processing unit (CPU) that is coupled to a switching matrix. Unlike an SCP, the components of the signaling processor 602 are capable of processing ISUP messages independently of TCAP queries.

SS7 MESSAGE DESIGNATIONS

SS7 messages are well known. Designations for various SS7 messages commonly are used. Those skilled in the art are familiar with the following message designations:

ACM - Address Complete Message
ANM - Answer Message
BLO - Blocking
BLA - Blocking Acknowledgment
CPG - Call Progress
CRG - Charge Information
CGB - Circuit Group Blocking
CGBA - Circuit Group Blocking Acknowledgment
GRS - Circuit Group Reset
GRA - Circuit Group Reset Acknowledgment
CGU - Circuit Group Unblocking
CGUA - Circuit Group Unblocking Acknowledgment
CQM - Circuit Group Query
CQR - Circuit Group Query Response
CRM - Circuit Reservation Message
CRA - Circuit Reservation Acknowledgment
CVT - Circuit Validation Test
CVR - Circuit Validation Response
CFN - Confusion
COT - Continuity
CCR - Continuity Check Request
EXM - Exit Message
INF - Information
INR - Information Request
IAM - Initial Address
LPA - Loop Back Acknowledgment
PAM - Pass Along
REL - Release
RLC - Release Complete
RSC - Reset Circuit
RES - Resume
SUS - Suspend
TCAP - Transaction Capabilities Application Part
UBL - Unblocking
UBA - Unblocking Acknowledgment
UCIC - Unequipped Circuit Identification Code.

CALL PROCESSOR TABLES

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 7:
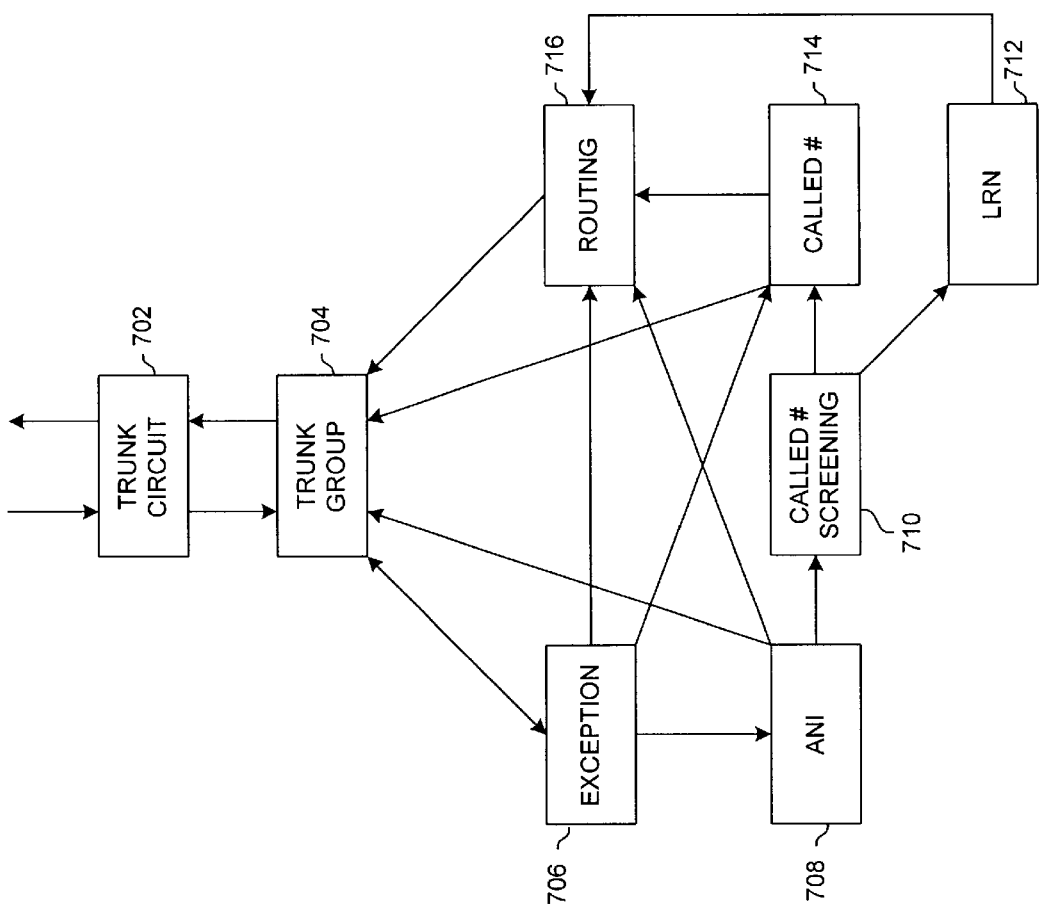
FIG. 7 is a block diagram of a data structure having tables that are used in the signaling processor of FIG. 6.

FIG. 7 depicts an exemplary data structure preferably used by the application platform 622 of FIG. 6 to execute the BCM. This is accomplished through a series of tables that point to one another in various ways. The pointers are typically comprised of next function and next index designations. The next function points to the next table, and the next index points to an entry or a range of entries in that table. The data structure has a trunk circuit table 702, a trunk group table 704, an exception table 706, an ANI table 708, a called number screening table 710, a location routing number (LRN) table 712, a called number table 714, and a routing table 716.

The trunk circuit table 702 contains information related to the connections. Typically, the connections are DS0 or ATM connections. Initially, the trunk circuit table 702 is used to retrieve information about the originating connection. Later, the table is used to retrieve information about the terminating connection. When the originating connection is being processed, the trunk group number in the trunk circuit table 702 points to the applicable trunk group for the originating connection in the trunk group table 704.

The trunk group table 704 contains information related to the originating and terminating trunk groups. When the originating connection is being processed, the trunk group table 704 provides information relevant to the trunk group for the originating connection and typically points to the exception table 706.

The exception table 706 is used to identify various exception conditions related to the call that may influence the routing or other handling of the call. Typically, the exception table 706 points to the ANI table 708. Although, the exception table 706 may point directly to the trunk group table 704, the called number table 714, or the routing table 716.

The ANI table 708 is used to identify any special characteristics related to the caller's number. The caller's number is commonly known as automatic number identification (ANI). The ANI table 708 typically points to the called number screening table 710. Although, the ANI table 708 may point directly to the trunk group table 704 or the routing table 716.

The called number screening table 710 is used to provide the trigger detection point (TDP) for an AIN 0.1 SCP TCAP query. It is used, for example, with the local number portability (LNP) feature. The called number screening table 710 invokes a TCAP. According to the TCAP response, either the LRN table 712 or the called number table 714 is accessed.

The LRN table 712 is used to identify routing requirements based on the called number for those calls that have a return response from an LNP query to an SCP, indicating that the called number is ported. The LRN table 712 points to the routing table 716.

The called number table 714 is used to identify routing requirements based on the called number. This will be the case for standard telephone calls. The called number table 714 typically points to the routing table 716. Although, it may point to the trunk group table 704.

The routing table 716 has information relating to the routing of the call for the various connections. The routing table 716 is entered from a pointer in the exception table 706, the ANI table 708, the LRN table 712, or the called number table 714. The routing table 716 typically points to a trunk group in the trunk group table 704.

When the exception table 706, the ANI table 708, the called number table 714, or the routing table 716 point to the trunk group table 704, they effectively select the terminating trunk group. When the terminating connection is being processed, the trunk group number in the trunk group table 704 and the trunk circuit table 706 is the index that points to the trunk group index. The truck group index contains the applicable terminating connection in the trunk circuit table 704.

The terminating trunk circuit is used to extend the call. The trunk circuit is typically a VP/VC or a DS0. Thus, it can be seen that by migrating through the tables, a terminating connection can be selected for a call.

Figure 8:
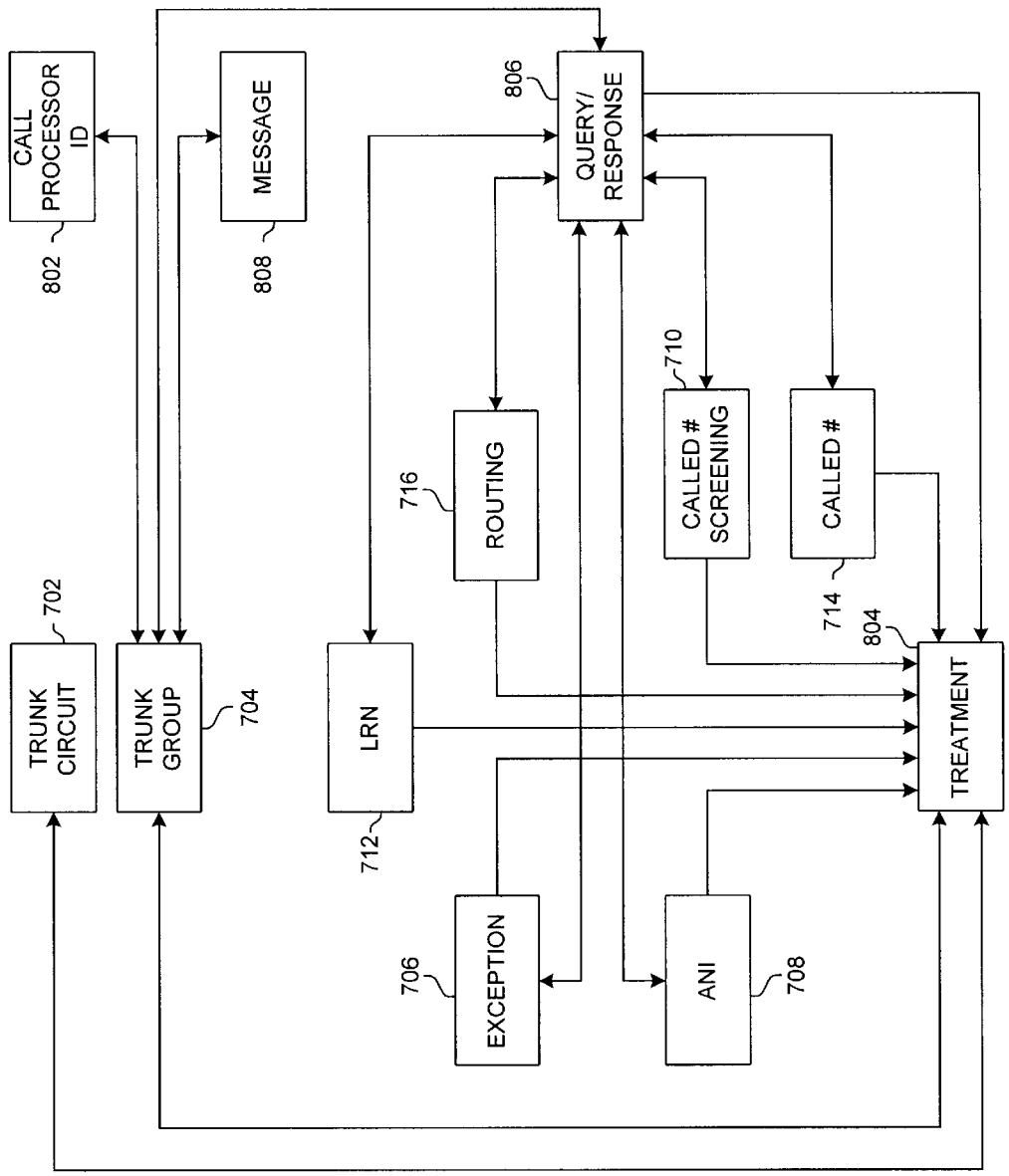
FIG. 8 is a block diagram of additional tables that are used in the signaling processor of FIG. 7.

FIG. 8 is an overlay of FIG. 7. The tables from FIG. 7 are present, but for clarity, their pointers have been omitted. FIG. 8 illustrates additional tables that can be accessed from the tables of FIG. 7. These include a call processor ID table 802, a treatment table 804, a query/response table 806, and a message table 808.

The call processor ID table 802 contains various call processor SS7 point codes. It can be accessed from the trunk group table 704, and it points back to the trunk group table 704.

The treatment table 804 identifies various special actions to be taken in the course of call processing. This will typically result in the transmission of a release message (REL) and a cause value. The treatment table 804 can be accessed from the trunk circuit table 702, the trunk group table 704, the exception table 706, the ANI table 708, the called number screening table 710, the LRN table 712, the called number table 714, the routing table 716, and the query/response table 806.

The query/response table 806 has information used to invoke the SCF. It can be accessed by the trunk group table 704, the exception table 706, the ANI table 708, the called number screening table 710, the LRN table 712, the called number table 714, and the routing table 716. It points to the trunk group table 704, the exception table 706, the ANI table 708, the called number screening table 710, the LRN table 712, the called number table 714, the routing table 716, and the treatment table 804.

The message table 808 is used to provide instructions for signaling messages from the termination side of the call. It can be accessed by the trunk group table 704 and points to the trunk group table 704.

FIGS. 9–18 depict examples of the various tables described above. FIG. 9 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or call processor associated with the originating circuit. For terminating circuit processing, the trunk group number is used to enter the table.

The table also contains the circuit identification code (CIC). The CIC identifies the circuit which is typically a DS0 or a VP/VC. Thus, the invention is capable of mapping the SS7 CICs to the ATM VP/VC. If the circuit is ATM, the VP and the VC also can be used for identification. The group member number is a numeric code that is used for terminating circuit selection. The hardware identifier identifies the location of the hardware associated with the originating circuit. The echo canceler (EC) identification (ID) entry identifies the echo canceler for the originating circuit.

The remaining fields are dynamic in that they are filled during call processing. The echo control entry is filled based on three fields in signaling messages: the echo suppresser indicator in the IAM or the circuit reservation message (CRM) and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 10 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the call processor controls all of the circuits. If the glare resolution entry is set to "none," the call processor yields. The continuity control entry lists the percent of calls requiring continuity tests on the trunk group.

Continuity control indicates whether continuity is to be checked. The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a call processor (ATM) or a switch (TDM). The outgoing message index (OMI) points to the message table so that outgoing messages can obtain parameters. The associated number plan area (NPA) entry identifies the area code.

Selection sequence (SEL SEQ) indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the call processor may release the call. During termination processing, the next function and index are used to enter the trunk circuit table. Reattempt circuit indicates if an outgoing call can be reattempted on a different circuit within the same truck group.

Default jurisdiction information parameter (JIP) is an NPA-NXX value that is used to identify the switch from which the call originates. If an ISUP JIP is not received in an IAM, the default JIP is the value recorded on the call processor CBI. Alternately, this field can hold a default LRN having a ten digit form of NPA-NXX-XXXX in which the first six digits can populate the JIP parameter. If an ISUP LRN is not received in an IAM, the default IAM is the value recorded on the call processor CBI. The next function and next index entries point to the next table.

FIG. 11 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network.

The called party number nature of address differentiates between 0+ calls, 1+ calls, test calls, and international calls. For example, international calls might be routed to a preselected international carrier. The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 12 depicts an example of the ANI table. The index is used to enter the fields of the table. The calling party category differentiates among types of calling parties, for example, test calls, emergency calls, and ordinary calls. The calling party\charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800\888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 13 depicts an example of a called number screening table. The index is used to enter the table. The nature of address entry indicates the type of dialed number, for example, national versus international. The "digits from" and "digits to" entries focus further processing unique to a range of called numbers. This is where the TCAP response information is incorporated in the call processing flow. This is where the trigger occurs for an LNP TCAP query launch. The processing follows the processing logic of the "digits from" and "digits to" fields in FIG. 11. The next function and next index point to the next table which is typically either the called number table or the LRN table.

FIG. 14 depicts an example of an LRN table. This table will perform the same function as the called number table for those calls that are identified as ported based upon an LNP query response. The index is used to enter the table. The nature of address entry indicates the type of dialed number, for example, national versus international. In an LRN case, the value is a national number. The "digits from" and "digits to" entries focus further processing unique to a range of called numbers. This is where the TCAP response information is incorporated in the call processing flow. The processing follows the processing logic of the "digits from" and "digits to" fields in FIG. 11. The next function and next index point to the next table which is typically the routing table.

FIG. 15 depicts an example of the called number table. The index is used to enter the table. The called number nature of address entry indicates the type of dialed number, for example, national versus international. The "digits from" and "digits to" entries focus further processing unique to a range of called numbers, and they are used in the LRN table check process. The processing follows the processing logic of the "digits from" and "digits to" fields in FIG. 1. The next function and next index point to the next table which is typically the routing table.

FIG. 16 depicts an example of a routing table. The index is used to enter the table. The transit network selection (TNS) network identification (ID) plan indicates the number of digits to use for the CIC. The transit network selection "digits" field defines the numbers to identify an international carrier. The circuit code indicates the need for an operator on the call. The next function, next index, and signal route entries in the routing table are used to identify a trunk group. The second and third next function/index/signal route entries define alternate routes. The third next function entry also can point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 8–16 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number screening, called number, routing, trunk group, and trunk circuit.

FIG. 17 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in an REL from the call processor. The next function and next index point to the next table.

FIG. 18 depicts an example of the message table. This table allows the call processor to alter information in outgoing messages. Message type is used to enter the table, and it represents the outgoing standard SS7 message type. The parameter is the pertinent parameter within the outgoing SS7 message. The indexes point to various entries in the trunk group table and determine if parameters are passed unchanged, omitted, or modified in the outgoing messages.

Those skilled in the art will appreciate that variations from the specific embodiments disclosed above are contemplated by the invention. The invention should not be restricted to the above embodiments, but should be measured by the following claims.

What is claimed is:

1. A system for allocating bandwidth for a call having call signaling and user communications, the system comprising:
   a virtual path group having a plurality of virtual paths having bandwidth initially under-allocated to each of the virtual paths;
   a signaling processor adapted to re-allocate the bandwidth available to a particular one of the virtual paths in a particular one of the virtual path groups when the bandwidth initially allocated to the particular virtual path is not sufficient to connect the call so that the particular virtual path uses bandwidth initially allocated for another virtual path in the virtual path group, to process the call signaling to select a connection over the particular virtual path, and to transport a control message that designates the selected connection; and
   an interworking unit adapted to receive the user communications in a communication format, to receive the control message from the signaling processor, to interwork the user communications between the communication format and asynchronous transfer mode cells that identify the selected connection, and to transport the asynchronous transfer mode cells over the selected connection.

2. The system of claim 1 wherein the signaling processor is adapted to track bandwidth usage by the virtual paths.

3. The system of claim 1 wherein the signaling processor is adapted to perform bandwidth management functions.

4. The system of claim 3 wherein the bandwidth management functions comprise call admission control.

5. The system of claim 1 wherein the signaling processor is adapted to perform call admission control functions for the virtual paths.

6. The system of claim 1 further comprising a second virtual path group having a plurality of second virtual paths having bandwidth initially allocated to each of the second virtual paths wherein the under-allocated particular virtual path uses bandwidth initially allocated for one of the second virtual paths in the second virtual path group.

7. The system of claim 1 wherein the signaling processor further is adapted to under-allocate the particular virtual path by a percentage of under-allocation.

8. The system of claim 1 wherein the signaling processor further is adapted to under-allocate the particular virtual path by a fixed number of under-allocation.

9. The system of claim 1 further comprising:
   a cross connect connected to the interworking unit through the particular virtual path; and
   a second virtual path group in connection with the cross connect having a plurality of second virtual paths having bandwidth initially allocated to each of the second virtual paths;
   wherein the signaling processor further is adapted to under-allocate a particular one of the second virtual paths so that the particular second virtual path uses bandwidth initially allocated to another second virtual path; and
   wherein the cross connect receives the asynchronous transfer mode cells from the connection on the particular virtual path and cross connects the asynchronous transfer mode cells to a second connection on the particular second virtual path.

10. The system of claim 9 wherein the signaling processor is adapted to under-allocate the particular second virtual path by selecting the connection in the particular virtual path that is to be cross connected to the second connection in the particular second virtual path.

11. The system of claim 9 wherein the cross connect comprises an asynchronous transfer mode switch.

12. The system of claim 9 wherein the particular second virtual path is connected to a second cross connect.

13. The system of claim 12 wherein the second cross connect comprises an asynchronous transfer mode switch.

14. The system of claim 1 further comprising a communication device adapted to transport the user communications to the interworking unit and to transport the call signaling to the signaling processor.

15. The system of claim 14 wherein the communication device comprises a local exchange switch.

16. The system of claim 14 wherein the communication device comprises a service platform.

17. A system for allocating bandwidth for a call having call signaling and user communications, the system comprising:
- a plurality of virtual path groups each having a plurality of virtual paths having bandwidth initially under-allocated to each of the virtual paths;
- a signaling processor adapted to re-allocate the bandwidth available to a particular one of the virtual paths in a particular one of the virtual path groups when the bandwidth initially allocated to the particular virtual path is not sufficient to connect the call so that the particular virtual path uses bandwidth initially allocated for another virtual path in another virtual path group, to process the call signaling to select a connection over the particular virtual path, and to transport a control message that designates the selected connection; and
- an interworking unit adapted to receive the user communications in a communication format, to receive the control message from the signaling processor, to interwork the user communications between the communication format and asynchronous transfer mode cells that identify the selected connection, and to transport the asynchronous transfer mode cells over the selected connection.

18. The system of claim 17 wherein the signaling processor is adapted to track bandwidth usage by the virtual paths.

19. The system of claim 17 wherein the signaling processor is adapted to perform bandwidth management functions.

20. The system of claim 19 wherein the bandwidth management functions comprise call admission control.

21. The system of claim 17 wherein the signaling processor is adapted to perform call admission control functions for the virtual paths.

22. The system of claim 17 wherein the under-allocated particular virtual path uses bandwidth initially allocated for another virtual path in the particular virtual path group.

23. The system of claim 17 wherein the signaling processor further is adapted to under-allocate the particular virtual path by a percentage of under-allocation.

24. The system of claim 17 wherein the signaling processor further is adapted to under-allocate the particular virtual path by a fixed number of under-allocation.

25. The system of claim 17 further comprising:
- a cross connect connected to the interworking unit through the particular virtual path; and
- a second virtual path group in connection with the cross connect having a plurality of second virtual paths having bandwidth initially allocated to each of the second virtual paths;
- wherein the signaling processor further is adapted to under-allocate a particular one of the second virtual paths so that the particular second virtual path uses bandwidth initially allocated to another second virtual path; and
- wherein the cross connect receives the asynchronous transfer mode cells from the connection on the particular virtual path and cross connects the asynchronous transfer mode cells to a second connection on the particular second virtual path.

26. The system of claim 25 wherein the signaling processor is adapted to under-allocate the particular second virtual path by selecting the connection in the particular virtual path that is to be cross connected to the second connection in the particular second virtual path.

27. The system of claim 25 wherein the cross connect comprises an asynchronous transfer mode switch.

28. The system of claim 25 wherein the particular second virtual path is connected to a second cross connect.

29. The system of claim 28 wherein the second cross connect comprises an asynchronous transfer mode switch.

30. The system of claim 17 further comprising a communication device adapted to transport the user communications to the interworking unit and to transport the call signaling to the signaling processor.

31. The system of claim 30 wherein the communication device comprises a local exchange switch.

32. The system of claim 30 wherein the communication device comprises a service platform.

33. A system for allocating bandwidth for a call having call signaling and user communications, the system comprising:
- a plurality of virtual channels;
- a plurality of virtual paths each having a portion of the virtual channels available for use therefor;
- a plurality of virtual path groups, each virtual path group having a portion of the virtual paths available for use therefor;
- a signaling processor adapted to allocate the virtual paths in the virtual path groups so that particular virtual paths use virtual channels from other virtual paths when needed, to receive the call signaling, to process the call signaling to select a connection over a selected one of the virtual paths over a selected one of the virtual path groups, and to transport a control message that designates the selected connection; and
- an interworking unit adapted to receive the user communications in a communication format, to receive the control message from the signaling processor, to interwork the user communications between the communication format and asynchronous transfer mode cells that identify the selected connection, and to transport the asynchronous transfer mode cells over the selected connection.

34. The system of claim 33 wherein the signaling processor is adapted to perform bandwidth management functions.

35. The system of claim 33 wherein the bandwidth management functions comprise call admission control.

36. The system of claim 33 further comprising:
- a cross connect connected to the interworking unit through the selected virtual path; and
- a second virtual path group in connection with the cross connect having a plurality of second virtual paths having bandwidth initially allocated to each of the second virtual paths;

wherein the signaling processor further is adapted to under-allocate a selected one of the second virtual paths so that the selected second virtual path uses bandwidth initially allocated to another second virtual path; and wherein the cross connect receives the asynchronous transfer mode cells from the connection on the selected virtual path and cross connects the asynchronous transfer mode cells to a second connection on the selected second virtual path.

37. The system of claim 36 wherein the cross connect comprises an asynchronous transfer mode switch.

38. The system of claim 36 wherein the selected second virtual path is connected to a second cross connect.

39. The system of claim 38 wherein the second cross connect comprises an asynchronous transfer mode switch.

40. The system of claim 33 further comprising a communication device adapted to transport the user communications to the interworking unit and to transport the call signaling to the signaling processor.

41. The system of claim 40 wherein the communication device comprises a local exchange switch.

42. The system of claim 40 wherein the communication device comprises a service platform.

43. A bandwidth allocation system for connecting a call over a network having a plurality of virtual channels with bandwidth and a plurality of virtual paths, each virtual path configured to use a portion of the bandwidth of the virtual channels, the call having call signaling and user communications, the system comprising:

a signaling processor adapted to re-allocate bandwidth available to the virtual paths for use by a selected one of the virtual path groups, to receive the call signaling, to process the call signaling to select a connection on a selected one of the re-allocated virtual paths, and to transport a control message that designates the selected connection; and an interworking unit adapted to receive the user communications in a communication format, to receive the control message from the signaling processor, and to interwork the user communications with the selected connection so that the selected virtual path uses bandwidth from another of the virtual paths.

44. The system of claim 43 wherein the signaling processor is adapted to perform bandwidth management functions.

45. The system of claim 44 wherein the bandwidth management functions comprise call admission control.

46. The system of claim 43 further comprising:

a cross connect connected to the interworking unit through the selected virtual path; and a second virtual path group in connection with the cross connect having a plurality of second virtual paths having bandwidth initially allocated to each of the second virtual paths;

wherein the signaling processor further is adapted to under-allocate a selected one of the second virtual paths so that the selected second virtual path uses bandwidth initially allocated to another second virtual path; and wherein the cross connect receives the asynchronous transfer mode cells from the connection on the selected virtual path and cross connects the asynchronous transfer mode cells to a second connection on the selected second virtual path.

47. The system of claim 46 wherein the cross connect comprises an asynchronous transfer mode switch.

48. The system of claim 46 wherein the selected second virtual path is connected to a second cross connect.

49. The system of claim 48 wherein the second cross connect comprises an asynchronous transfer mode switch.

50. The system of claim 43 further comprising a communication device adapted to transport the user communications to the interworking unit and to transport the call signaling to the signaling processor.

51. The system of claim 50 wherein the communication device comprises a local exchange switch.

52. The system of claim 50 wherein the communication device comprises a service platform.

53. A bandwidth allocation system for connecting a call over an asynchronous transfer mode system having a plurality of virtual paths, each virtual path having bandwidth initially under-allocated thereto, the call having call signaling and user communications, the system comprising:

a signaling processor adapted to receive the call signaling and to process the call signaling to select a virtual connection over a selected one of the under-allocated virtual paths, the selected under-allocated virtual path having used all of the bandwidth initially allocated thereto, and to transport a control message that designates the selected virtual connection;

a bandwidth allocation platform adapted to determine that the selected under-allocated virtual path has used all of the bandwidth initially allocated thereto and to allocate bandwidth if available from another virtual path so that the selected virtual path can use the bandwidth; and an interworking unit adapted to receive the user communications in a communication format, to receive the control message from the signaling processor, to interwork the user communications between the communication format and asynchronous transfer mode cells that identify the selected virtual connection, and to transport the asynchronous transfer mode cells over the selected virtual connection.

54. The system of claim 53 wherein the signaling processor is adapted to perform call admission control functions for the under-allocated virtual paths.

55. The system of claim 53 wherein the bandwidth allocation platform is adapted to manage allocation of particular ones of the under-allocated virtual paths on a point code basis so that the bandwidth allocation platform can track connections over the under-allocated virtual paths.

56. The system of claim 53 wherein the bandwidth allocation platform is adapted to track bandwidth allocation of the under-allocated virtual paths to determine current usage of bandwidth in the under-allocated virtual paths.

57. The system of claim 53 wherein the bandwidth allocation platform is adapted to track bandwidth allocation of the selected under-allocated virtual path to determine current usage of bandwidth in the selected under-allocated virtual path.

58. The system of claim 53 wherein the bandwidth allocation platform is adapted to use restrictive controls that block the call when bandwidth is not available for the selected under-allocated virtual path.

59. The system of claim 53 wherein the bandwidth allocation platform is adapted to use expansive controls to reroute the call from the selected under-allocated virtual path to another virtual path when bandwidth is not available for the selected under-allocated virtual path.

60. The system of claim 53 wherein the selected under-allocated virtual path is limited to a fixed number of allocated bandwidth.

61. The system of claim 53 wherein the selected under-allocated virtual path is limited to a fixed percentage of allocated bandwidth.

62. The system of claim 61 wherein the signaling processor is adapted to transmit a second control message to the bandwidth allocation platform to notify the bandwidth allocation platform when the signaling processor selects the connection over the selected under-allocated virtual paths.

63. The system of claim 61 wherein the signaling processor is adapted to transmit a second control message to the bandwidth allocation platform to request the bandwidth allocation platform to allocate bandwidth to the selected under-allocated virtual path.

64. The system of claim 61 wherein the bandwidth allocation platform is adapted to anticipate that one of the under-allocated virtual paths will require additional bandwidth and to allocate bandwidth to the one under-allocated virtual path.

65. A bandwidth allocation system for connecting a call over an asynchronous transfer mode system having a plurality of virtual paths, each virtual path having bandwidth initially under-allocated thereto, the call having call signaling and user communications, the system comprising:
a signaling processor adapted to receive the call signaling and to process the call signaling to select a virtual connection over a selected one of the under-allocated virtual paths, the selected under-allocated virtual path having used all of the bandwidth initially allocated thereto, to transport a control message that designates the selected virtual connection, and to allocate bandwidth if available from another virtual path so that the selected under-allocated virtual path can use the bandwidth;
a bandwidth allocation platform adapted to track usage of the under-allocated virtual paths and to provide to the signaling processor is usage information about the under-allocated virtual paths available so that the signaling processor can select the connection; and
an interworking unit adapted to receive the user communications in a communication format, to receive the control message from the signaling processor, to interwork the user communications between the communication format and asynchronous transfer mode cells that identify the selected virtual connection, and to transport the asynchronous transfer mode cells over the selected virtual connection.

66. The system of claim 65 wherein the signaling processor is adapted to perform call admission control functions for the under-allocated virtual paths.

67. The system of claim 66 wherein the bandwidth allocation platform is adapted to manage allocation of particular ones of the virtual paths on a point code basis so that the bandwidth allocation platform can track connections over the under-allocated virtual paths.

68. The system of claim 66 wherein the signaling processor is adapted to use restrictive controls that block the call when bandwidth is not available for the selected under-allocated virtual path.

69. The system of claim 66 wherein the signaling processor is adapted to use expansive controls to reroute the call from the selected under-allocated virtual path to another virtual path when bandwidth is not available for the selected under-allocated virtual path.

70. The system of claim 66 wherein the selected under-allocated virtual path is limited to a fixed number of allocated bandwidth.

71. The system of claim 66 wherein the selected under-allocated virtual path is limited to a fixed percentage of allocated bandwidth.

72. The system of claim 66 wherein the signaling processor is adapted to transmit a second control message to the bandwidth allocation platform to notify the bandwidth allocation platform when the signaling processor selects the connection over the selected under-allocated virtual path.

73. A system for allocating bandwidth for calls having call signaling and user communications, the system comprising:
a plurality of virtual paths each having bandwidth initially allocated thereto;
a plurality of signaling processors linked together, each adapted to re-allocate the bandwidth for particular under-allocated virtual paths when the bandwidth initially allocated to the particular under-allocated virtual paths is not sufficient to connect the calls so that the re-allocated particular virtual paths may use bandwidth initially allocated for other of the virtual paths, to process call signaling for the calls to select connections over the re-allocated particular virtual paths, and to transport control messages that designate the selected connections;
a plurality of interworking units adapted to receive user communications for calls, to receive control messages from the signaling processors, and to interwork the user communications to the selected connections on the under-allocated virtual paths; and
a plurality of cross connects adapted to connect the interworking units through the selected connections on the particular virtual paths.

74. The system of claim 73 further comprising a bandwidth allocation platform adapted to track usage of the virtual paths and to manage usage of the virtual paths.

75. The system of claim 73 wherein the signaling processors are adapted to manage under-allocation of the particular virtual paths on a point code basis so that the signaling processors can track connections over the particular virtual paths.

76. The system of claim 73 wherein the signaling processors are adapted to track bandwidth allocation of the particular virtual paths to determine current usage of bandwidth in the particular virtual paths.

77. The system of claim 73 wherein the signaling processors are adapted to use restrictive controls that block calls when bandwidth is not available for connections on the particular virtual paths.

78. The system of claim 73 wherein the signaling processors are adapted to use expansive controls to reroute a particular one of the calls from a particular connection on a first particular virtual path to a second particular connection on a second particular virtual path when bandwidth is not available for the first particular virtual path.

79. The system of claim 73 wherein the under-allocated virtual paths are limited to a fixed number of under-allocated bandwidth.

80. The system of claim 73 wherein the under-allocated virtual paths are limited to a fixed percentage of under-allocated bandwidth.

81. The system of claim 73 wherein each of the signaling processors is adapted to track under-allocation of virtual paths by the other signaling processors.

82. The system of claim 81 wherein a first one of the signaling processors is adapted to query a second one of the signaling processors to determine if the second signaling processor has allocated designated particular virtual paths for usage.

83. The system of claim 81 wherein the first signaling processor is adapted to query the second signaling processor after the first signaling processor has allocated a threshold percentage of particular virtual paths available for allocation by the first signaling processor.

84. The system of claim 81 wherein a first one of the signaling processors is adapted to transmit a control message to a second one of the signaling processors when the first signaling processor allocates a designated particular virtual path for usage.

85. The system of claim 73 wherein the under-allocated virtual paths are not limited to a fixed number of under-allocated bandwidth.

86. The system of claim 73 wherein the under-allocated virtual paths are not limited to a fixed percentage of under-allocated bandwidth.

87. A system for connecting a call in an asynchronous transfer mode system having a plurality of virtual paths, each virtual path having bandwidth initially under-allocated thereto, the call having call signaling and user communications, the system comprising:

a first signaling processor adapted to receive the call signaling and to process the call signaling to select a first connection over a selected first one of the virtual paths, the first virtual path having used all of the bandwidth initially under-allocated thereto, to transport a first control message that designates the selected first connection, and to transport a second control message that designates the first connection;

a second signaling processor adapted to receive the first control message transported by the first signaling processor, to process the first control message to select a second connection for the user communications, and to transport a third control message designating the second connection;

a bandwidth allocation platform adapted to track bandwidth usage by the plurality of virtual paths and to identify the first virtual path for re-allocation so that the first virtual path may use bandwidth initially allocated to another of the virtual paths;

a first interworking unit adapted to receive the user communications in a communication format, to receive the second control message from the first signaling processor, and to interwork the user communications with the selected first connection over the under-allocated first virtual path;

a second interworking unit adapted to receive the user communications interworked from the first interworking unit, to receive the third control message from the second signaling processor, and to interwork the user communication with the selected second connection.

88. The system of claim 87 further comprising:

a first cross connect connected to the first interworking unit by the first virtual path and connected to a second one of the plurality of virtual paths, the second virtual path having used all of the bandwidth allocated thereto; and a second cross connect connected to the first cross connect by the second virtual path and connected to the second interworking unit by a third one of the plurality of virtual paths;

wherein the bandwidth allocation platform further is adapted to under-allocate bandwidth for the second virtual path so that the second virtual path may use bandwidth initially allocated to another of the virtual paths;

wherein the first cross connected further is adapted to cross connect the user communications over the under-allocated second virtual path so that the user communications are transported to the second cross connect; and wherein the second cross connect further is adapted to cross connect the user communication over the third virtual path so that the user communications are transported to the second interworking unit.

89. The system of claim 87 wherein the bandwidth allocation platform is adapted to under-allocate the first virtual path.

90. The system of claim 87 wherein the first signaling processor is adapted to under-allocate the first virtual path.

91. The system of claim 87 wherein the bandwidth allocation platform is adapted to manage under-allocation of particular ones of the virtual paths on a point code basis so that the bandwidth allocation platform can track connections over the virtual paths.

92. The system of claim 87 wherein the bandwidth allocation platform is adapted to use restrictive controls that block the call when bandwidth is not available for the first virtual path.

93. The system of claim 87 wherein the bandwidth allocation platform is adapted to use expansive controls to reroute the call from the first virtual path to another virtual path when bandwidth is not available for the first virtual path.

94. The system of claim 87 wherein the first signaling processor is adapted to transmit a fourth control message to the bandwidth allocation platform to notify the bandwidth allocation platform when the first signaling processor selects a connection on the connection over the first virtual path.

95. The system of claim 87 wherein the bandwidth allocation platform is adapted to anticipate that one of the virtual paths will require additional bandwidth and to under-allocate bandwidth for the one virtual path.

96. A method for connecting a call over an ATM system, the call having call signaling and user communications, the method comprising:

configuring a particular one of a plurality of ATM virtual paths for under-allocation of bandwidth so that as the particular ATM virtual path requires more bandwidth than allocated to connect the call the particular ATM virtual path uses the required bandwidth from another ATM virtual path;

configuring an ATM connection over the particular ATM virtual path as a constant-bit rate connection;

receiving the call signaling and processing the call signaling to select the ATM connection over the particular ATM virtual path to connect the call; and receiving the user communications over a TDM connection and interworking the user communications with the selected ATM connection as constant bit-rate traffic.

97. The method of claim 96 further comprising performing call admission control functions for the virtual paths.

98. The method of claim 96 further comprises managing under-allocation of the virtual paths on a point code basis to track connections over the virtual paths.

99. The method of claim 96 further comprising tracking bandwidth allocation of the virtual paths to determine current usage of bandwidth in the virtual paths.

100. A method for connecting a call over an ATM system, the call having call signaling and user communications, the method comprising:

configuring a particular one of a plurality of ATM virtual paths for under-allocation of bandwidth so that as the particular ATM virtual path requires more bandwidth than allocated to connect the call the particular ATM virtual path uses the required bandwidth initially allocated to another ATM virtual path;

configuring an ATM connection over the particular ATM virtual path as a constant-bit rate connection;

receiving the call signaling in a signaling processor and processing the call signaling to select the ATM connection over the particular ATM virtual path to connect the call;

transporting a control message from the signaling processor identifying the selected ATM connection; and receiving the user communications over a TDM connection in an interworking unit and receiving the control message from the signaling processor in the interworking unit and interworking the user communications with the selected ATM connection identified in the control message.

101. The method of claim 100 further comprising performing in the signaling processor call admission control functions for the virtual paths.

102. The method of claim 100 further comprising performing in a bandwidth management platform call admission control functions for the virtual paths.

103. The method of claim 100 further comprises managing under-allocation of the virtual paths on a point code basis to track connections over the virtual paths.

104. The method of claim 100 further comprising tracking bandwidth allocation of the virtual paths to determine current usage of bandwidth in the virtual paths.

* * * * *

UNITED STATES PATENT AND TRADEMARK OFFICE
CERTIFICATE OF CORRECTION

PATENT NO. : 6,314,103 B1
DATED : November 6, 2001
INVENTOR(S) : Khalid Mohamed Medhat, Michael Joseph Gardner and Dean Charles Boldt It is certified that error appears in the above-identified patent and that said Letters Patent is hereby corrected as shown below:

<u>Title page,</u>
Item [63], Continuation Data should be deleted in its entirety.

Signed and Sealed this

Thirtieth Day of April, 2002

*Attest:*

JAMES E. ROGAN
*Director of the United States Patent and Trademark Office*

*Attesting Officer*